US008078735B2

(12) United States Patent
Gobara et al.

(10) Patent No.: US 8,078,735 B2
(45) Date of Patent: Dec. 13, 2011

(54) INFORMATION PROCESSING SYSTEM, TUNNEL COMMUNICATION DEVICE, TUNNEL COMMUNICATION METHOD, AND PROGRAM

(75) Inventors: Kunio Gobara, Osaka (JP); Hajime Maekawa, Osaka (JP); Kenichi Matsumoto, Osaka (JP); Masanobu Koyama, Osaka (JP)

(73) Assignee: Panasonic Corporation, Osaka (JP)

( * ) Notice: Subject to any disclaimer, the term of this patent is extended or adjusted under 35 U.S.C. 154(b) by 928 days.

(21) Appl. No.: 12/088,616

(22) PCT Filed: Feb. 28, 2006

(86) PCT No.: PCT/JP2006/303706
§ 371 (c)(1),
(2), (4) Date: Mar. 28, 2008

(87) PCT Pub. No.: WO2007/037025
PCT Pub. Date: Apr. 5, 2007

(65) Prior Publication Data
US 2009/0138610 A1   May 28, 2009

(30) Foreign Application Priority Data

Sep. 29, 2005   (JP) ................................. 2005-284323

(51) Int. Cl.
*G06F 15/16*   (2006.01)

(52) U.S. Cl. ...................................... 709/227; 709/228

(58) Field of Classification Search .................. 709/205, 709/227, 228
See application file for complete search history.

(56) References Cited

U.S. PATENT DOCUMENTS

| 6,614,782 B1 * | 9/2003 | Wehrend et al. ............... 370/352 |
| 6,636,516 B1 * | 10/2003 | Yamano .................... 370/395.52 |
| 7,424,033 B2 * | 9/2008 | Kwak ............................ 370/466 |
| 2003/0214955 A1 | 11/2003 | Kim |
| 2005/0135663 A1 * | 6/2005 | Okada et al. .................. 382/128 |

FOREIGN PATENT DOCUMENTS

| JP | 2002-057723 | 2/2002 |
| JP | 2003-273892 | 9/2003 |
| JP | 2004-007671 | 1/2004 |
| JP | 2004-072695 | 3/2004 |
| JP | 2005-260715 | * 9/2005 |

OTHER PUBLICATIONS

International Search Report for PCT/JP2006/303706; Apr. 10, 2006.
Charlie Scott, Paul Wolfe, Mike Erwin; "Virtual Private Networks, Second Edition"; O'Reilly; Dec. 1998; pp. 1-9 and 11-22.

* cited by examiner

*Primary Examiner* — David Lazaro
*Assistant Examiner* — Marie Georges Henry
(74) *Attorney, Agent, or Firm* — Pearne & Gordon LLP

(57) ABSTRACT

Provided are an information processing system, a tunnel communication device, a tunnel communication method, and a program that can make a communication between plural information processing devices belonging to different LANs without a user's making a complex setup. In the information processing system, a first tunnel communication unit encapsulates a packet from a first information processing device, transmits the encapsulated packet through a path of a P2P communication, and decapsulates the packet transmitted from a second tunnel communication device through the path of the P2P communication. A second tunnel communication unit encapsulates the packet transmitted from the second information processing device, transmits the encapsulated packet through the path of the P2P communication, and decapsulates the packet transmitted from the first tunnel communication device through the path of the P2P communication.

11 Claims, 17 Drawing Sheets

ORIGINAL PACKET

ORIGINAL PACKET

INFORMATION PROCESSING SYSTEM, TUNNEL COMMUNICATION DEVICE, TUNNEL COMMUNICATION METHOD, AND PROGRAM

TECHNICAL FIELD

The present invention relates to an information processing system, a tunnel communication device, a tunnel communication method, and a program, for encapsulating a packet to make a tunnel communication.

BACKGROUND ART

Conventionally, in information processing systems, tunnel communication devices, tunnel communication methods, and programs for encapsulating a packet to make a tunnel communication, plural points connected to a communication line such as Internet could communicate with each other as if they are connected to each other through an exclusive line, by using a technology of a virtual private network (hereinafter, referred to as "VPN). This configuration is disclosed in Charlie Scott's Document ("Virtual Private Networks, Second Edition" written by Charlie Scott, Paul Wolfe, and Mike Erwin, O'REILLY, December of 1998, P1~9 and P11 to 22).

However, in the conventional information processing system encapsulating a packet to make a tunnel communication, a complex setup for a device serving as a connection point such as a router is required to connect plural local area networks and a user should make such a setup. Therefore, if the user cannot set up a network well, it is difficult to make a communication between plural points.

DISCLOSURE OF THE INVENTION

The invention provides an information processing system, a tunnel communication device, a tunnel communication method, and a program for making a communication between plural information processing devices belonging to different local area networks without a user's making a complex setup.

An information processing system according to an aspect of the invention includes a first information processing device, a first tunnel communication device, a first communication processing device, a second information processing device, a second tunnel communication device, and a second communication processing device. The first tunnel communication device can communicate with the first information processing device. The first communication processing device processes the communication of the first tunnel communication device. The second tunnel communication device can communicate with the second information processing device. The second communication processing device performs the communication-related process of the second tunnel communication device and is connected to the first communication processing device through a communication line, The first tunnel communication device includes a first peer-to-peer (hereinafter, referred to as "P2P") communication setup unit and a first tunnel communication unit. The first P2P communication setup unit sets up a P2P communication with the second tunnel communication device. The first tunnel communication unit makes a tunnel communication through a path of the P2P communication set up by the first P2P communication setup unit. The first tunnel communication unit encapsulates a packet transmitted from the first information processing device, transmits the encapsulated packet through the path of the P2P communication, and decapsulates the encapsulated packet transmitted from the second tunnel communication device through the path of the P2P communication.

The first information processing device receives the packet decapsulated by the first tunnel communication unit. The second tunnel communication device includes a second P2P communication setup unit and a second tunnel communication unit. The second P2P communication setup unit sets up a P2P communication with the first tunnel communication device. T second tunnel communication unit makes a tunnel communication through a path of the P2P communication set up by the second P2P communication setup unit. The second tunnel communication unit encapsulates a packet transmitted from the second information processing device, transmits the encapsulated packet through the path of the P2P communication, and decapsulates the encapsulated packet transmitted from the first tunnel communication device through the path of the P2P communication. The second information processing device receives the packet decapsulated by the second tunnel communication unit.

According to this configuration, without a user's making a complex setup, the first information processing device and the second information processing device can communicate with each other as if they belong to the same network. Accordingly, the first information processing device and the second information processing device can perform processes such as sharing of a file which can be performed when they belong to the same network, even when they practically belong to different networks.

In the information processing system, the first tunnel communication unit may encapsulate a packet which is transmitted from the first information processing device and of which the destination is the second information processing device and may transmit the encapsulated packet through the path of the P2P communication, when the tunnel communication using the path of the P2P communication is made, but may not encapsulate the other packets. The second tunnel communication unit may encapsulate all the packets transmitted from the second information processing device and may transmit the encapsulated packets through the path of the P2P communication, when the tunnel communication using the path of the P2P communication is made. According to this configuration, the first information processing device and the second information processing device can access a communication line such as Internet through the first tunnel communication device.

The information processing system may further include an address assignor. The address assignor belongs to the same local area network as the local area network to which the first tunnel communication device and that assigns an address to a device. An address of the first information processing device is assigned by the address assignor, and an address of the second information processing device is assigned by the address assignor in the tunnel communication through the path of the P2P communication. According to this configuration, the proper address used for the second information processing device in the communication with the first information processing device is assigned by the address assignor. The second information processing device can make a tunnel communication with the first information processing device through the path of the P2P communication using the address.

In the information processing system, the first tunnel communication device may further include a first switching unit and the second tunnel communication device may further include a second switching unit and an address acquisition controlling unit. The first switching unit switches a mode between a tunnel mode in which the first information processing device makes a tunnel communication using the first tunnel communication unit and a normal mode in which the first information processing device does not make the tunnel communication. The second switching unit switches a mode between a tunnel mode in which the second information processing device makes a tunnel communication using the second tunnel communication unit and a normal mode in which the second information processing device does not make the tunnel communication. The address acquisition controlling unit that controls the second information processing device to perform a address acquiring process when the second switching unit switches the mode from the normal mode to the tunnel mode.

According to this configuration, the switching unit can switch a mode between the normal mode and the tunnel mode. When the tunnel communication is not made through the path of the P2P communication, the first information processing device and the second information processing device can make a normal communication with each other through a communication line in the normal mode. When the mode is switched from the normal mode to the tunnel mode, the second information processing device has to acquire a new address used for the tunnel communication with the first information processing device, and the second information processing device can be controlled to perform such a process by the address acquisition controlling unit.

In the information processing system, the first tunnel communication device may further include a communication processing unit that performs communication-related process. According to this configuration, since the communication-related process can be performed in the first tunnel communication device, for example, a third information processing device connected to a local side of the first communication processing device and the wide side of the first tunnel communication device cannot be made to access the first information processing device and the second information processing device during the tunnel communication as a calling party.

In the information processing system, the communication processing unit may perform the communication-related process on a packet which is transmitted through the first tunnel communication device but not encapsulated. According to this configuration, the packet having been subjected to the encapsulation process or the decapsulation process by the first tunnel communication unit can be made not to be subjected to the communication-related process of the communication processing unit.

In the information processing system, the communication processing unit may perform the communication-related process on all packets which are transmitted through the first tunnel communication device. According to this configuration, it is possible to transmit and receive the packet through the communication processing unit, regardless of whether the encapsulation process or the decapsulation process is performed by the first tunnel communication unit or not.

In the information processing system, the first tunnel communication device may further includes a first switching unit and a first address acquisition controlling unit and the second tunnel communication device may further include a second switching unit and an address acquisition controlling unit. The communication-related process may not be performed by the communication processing unit in the normal mode. The first switching unit switches a mode between a tunnel mode in which the first information processing device makes a tunnel communication using the first tunnel communication unit and a normal mode in which the first information processing device does not make the tunnel communication. The first address acquisition controlling unit controls the first information processing device to perform an address acquiring process when the first switching unit switches the mode from the normal mode to the tunnel mode. The second switching unit switches a mode between a tunnel mode in which the second information processing device makes a tunnel communication using the second tunnel communication unit and a normal mode in which the second information processing device does not make the tunnel communication. The address acquisition controlling unit controls the second information processing device to perform an address acquiring process when the second switching unit switches the mode from the normal mode to the tunnel mode.

According to this configuration, the normal mode and the tunnel mode can be switched by the switching unit. When the tunnel communication is not made through the path of the P2P communication, the first information processing device and the second information processing device can make a normal communication through a communication line in the normal mode. When the normal mode is switched to the tunnel mode, the information processing devices have to acquire a new address used in the tunnel communication. The information processing devices are controlled to perform such a process by the address acquisition controlling units, respectively.

In the information processing system, the first tunnel communication unit may encapsulate all packets transmitted from the first information processing device and transmit the encapsulated packets through the path of the P2P communication when the tunnel communication is made through the path of the P2P communication. The second tunnel communication unit may encapsulate all packets transmitted from the second information processing device and transmit the encapsulated packets through the path of the P2P communication when the tunnel communication is made through the path of the P2P communication.

According to this configuration, when the tunnel communication is made, the first information processing device and the second information processing device cannot communicate with a device connected to the communication line or a device connected to a local side of the communication processing device and a wide side of the tunnel communication device. As a result, it is possible to enhance the safety in communication between the first information processing device and the second information processing device when the tunnel communication is made.

In the information processing system, the first tunnel communication device may further include a first address assigning unit that assigns an address to the first information processing device, and the second tunnel communication device may further include a second address assigning unit that assigns an address to the second information processing device. According to this configuration, it is possible to assign an address used in the tunnel communication by the use of the address assigning unit.

In the information processing system, the first tunnel communication device may further include a first switching unit and the second tunnel communication device may further include a second switching unit. The first switching unit switches a mode between a tunnel mode in which the first information processing device makes a tunnel communication using the first tunnel communication unit and a normal mode in which the first information processing device does not make the tunnel communication. The second switching unit switches a mode between a tunnel mode in which the second information processing device makes a tunnel communication using the second tunnel communication unit and a normal mode in which the second information processing device does not make the tunnel communication. According to this configuration, the normal mode and the tunnel mode can be switched by the switching units. When the tunnel communication is not made through the P2P communication path, the first information processing device and the second information processing device can make a normal communication through a communication line in the normal mode.

DESCRIPTION OF REFERENCE NUMERALS AND SIGNS

Figure 1:
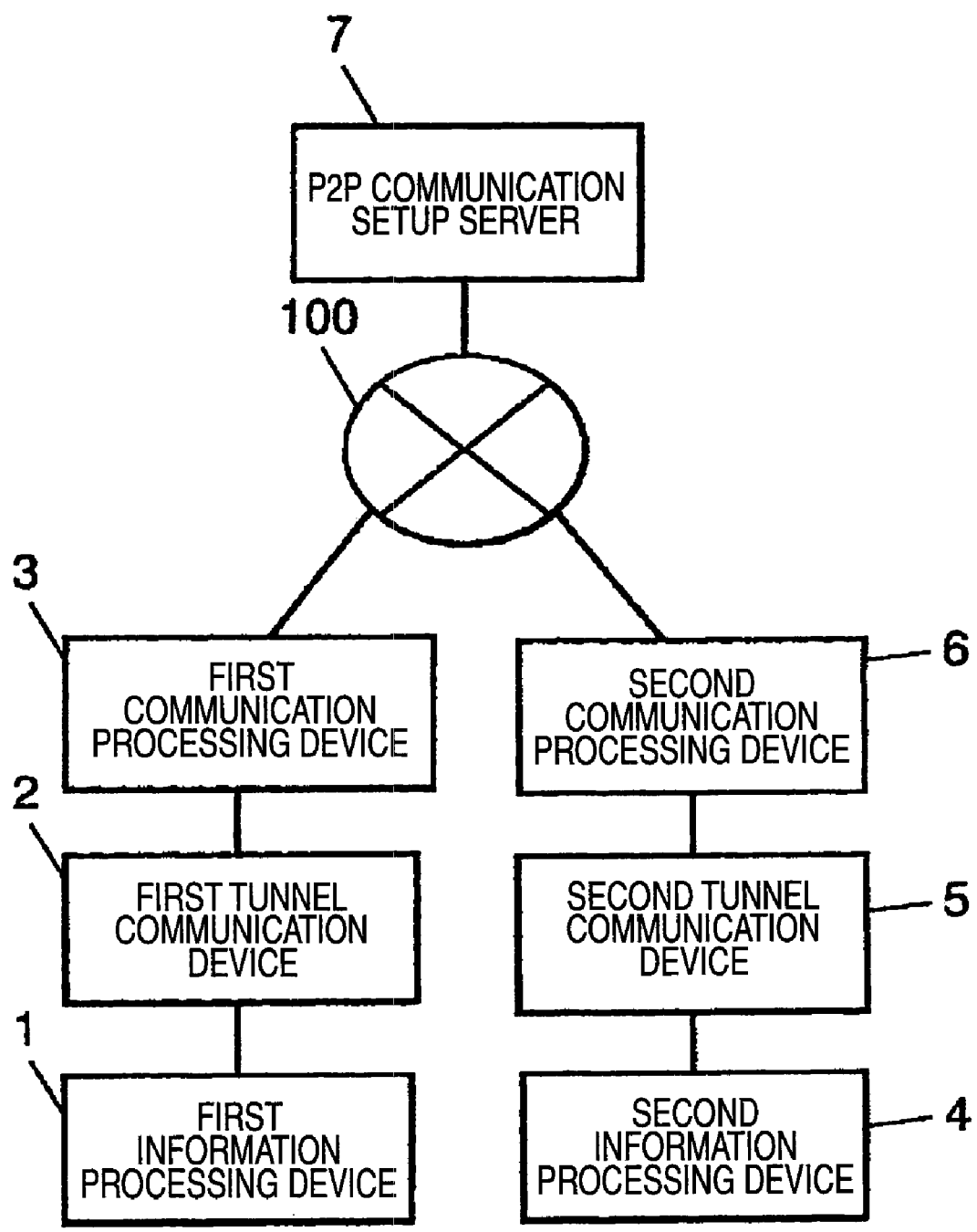
FIG. 1 is a block diagram illustrating a configuration of an information processing system according to a first embodiment of the invention.

1: FIRST INFORMATION PROCESSING DEVICE
2, 8, 9, 10: FIRST TUNNEL COMMUNICATION DEVICE
3: FIRST COMMUNICATION PROCESSING DEVICE
4: SECOND INFORMATION PROCESSING DEVICE
5, 20: SECOND TUNNEL COMMUNICATION DEVICE
6: SECOND COMMUNICATION PROCESSING DEVICE
7: P2P COMMUNICATION SETUP SERVER
21: FIRST P2P COMMUNICATION SETUP UNIT
22, 91, 101: FIRST TUNNEL COMMUNICATION UNIT
23: FIRST WIDE INTERFACE
24: FIRST LOCAL INTERFACE
25: FIRST SWITCHING UNIT
31, 93, 96: ADDRESS ASSIGNOR
51: SECOND P2P COMMUNICATION SETUP UNIT
52: SECOND TUNNEL COMMUNICATION UNIT
53: SECOND WIDE INTERFACE
54: SECOND LOCAL INTERFACE
55: SECOND SWITCHING UNIT
56: ADDRESS ACQUISITION CONTROLLING UNIT
92, 95: COMMUNICATION PROCESSING UNIT
94: FIRST ADDRESS ACQUISITION CONTROLLING UNIT
100, 200: COMMUNICATION LINE
102: FIRST ADDRESS ASSIGNING UNIT
201: SECOND ADDRESS ASSIGNING UNIT
301, 302: CPU (COMPUTER)
305, 306: RECORDING MEDIUM

BEST MODE FOR CARRYING OUT THE INVENTION

Hereinafter, embodiments of the invention will be described with the accompanying drawings. In the following embodiments, elements and steps denoted by like reference numerals are equal to each other or correspond to each other and description thereof may be omitted.

First Embodiment

An information processing system and a tunnel communication device according to a first embodiment of the invention will be described with reference to the drawings.

Figure 2:
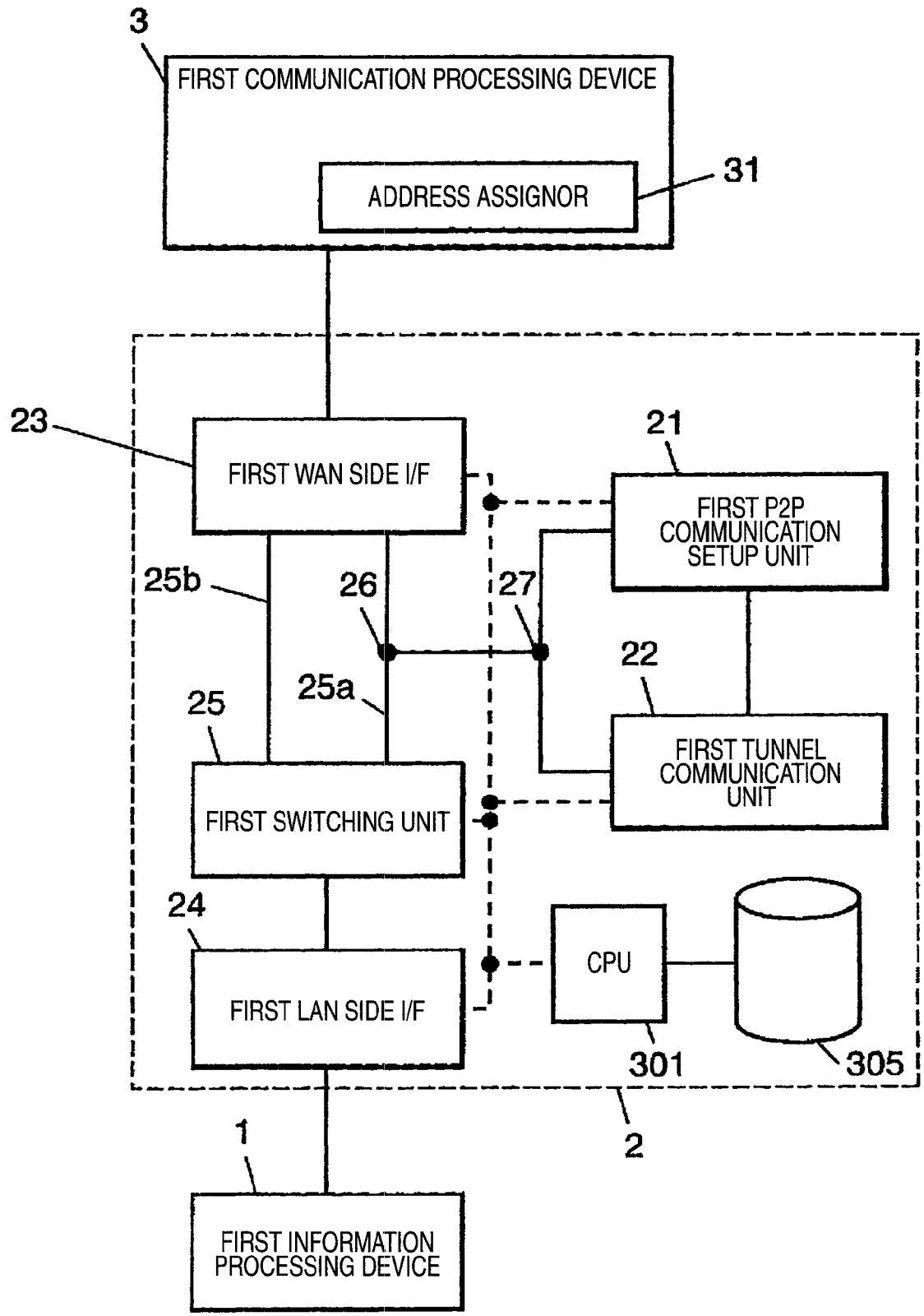
FIG. 2 is a block diagram illustrating a configuration of a first tunnel communication device according to the first embodiment.
Figure 3:
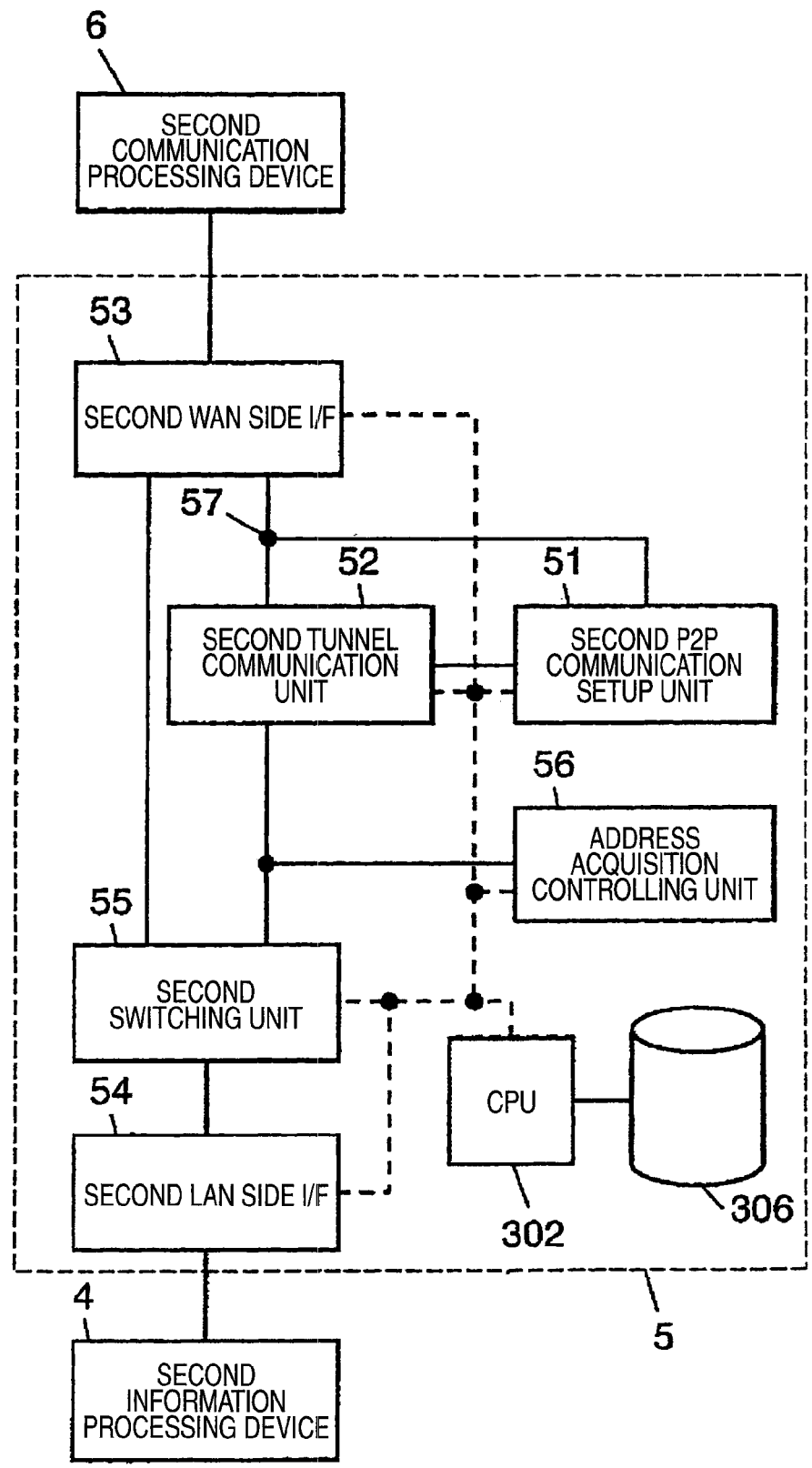
FIG. 3 is a block diagram illustrating a configuration of a second tunnel communication device according to the first embodiment.
Figure 4:
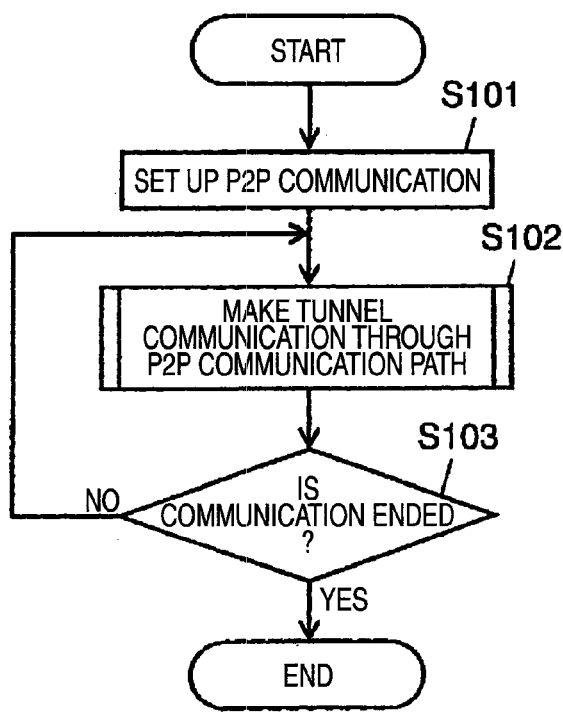
FIG. 4 is a flowchart illustrating an operation of the first tunnel communication device according to the first embodiment.
Figure 5:
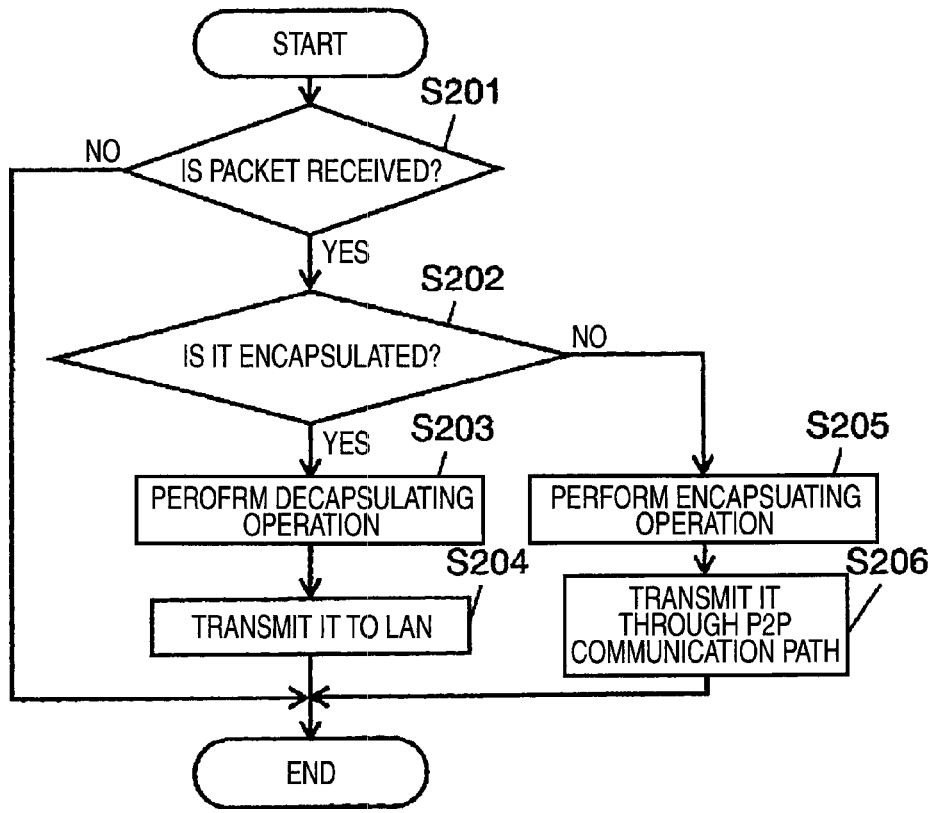
FIG. 5 is a flowchart illustrating another operation of the first tunnel communication device according to the first embodiment.
Figure 6:
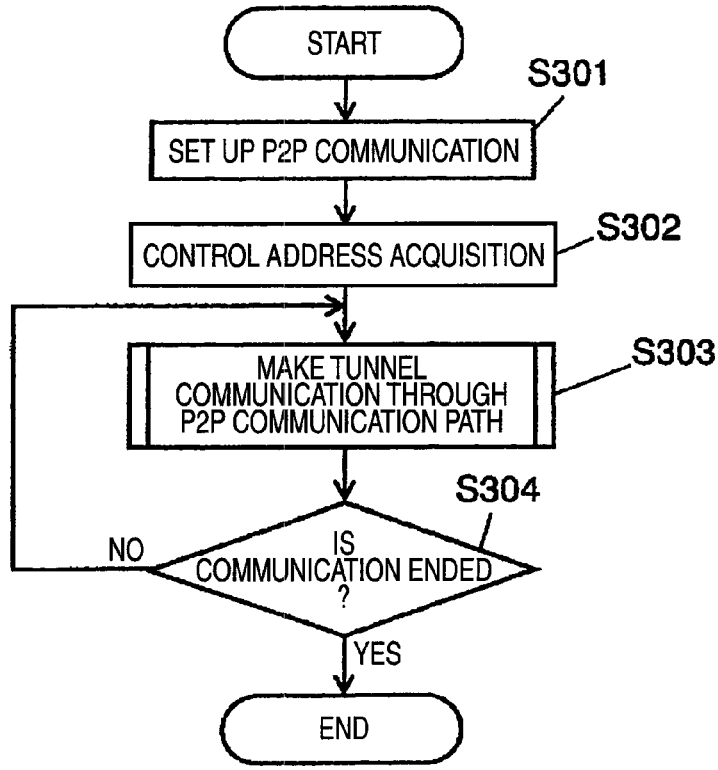
FIG. 6 is a flowchart illustrating an operation of the second tunnel communication device according to the first embodiment.
Figure 7:
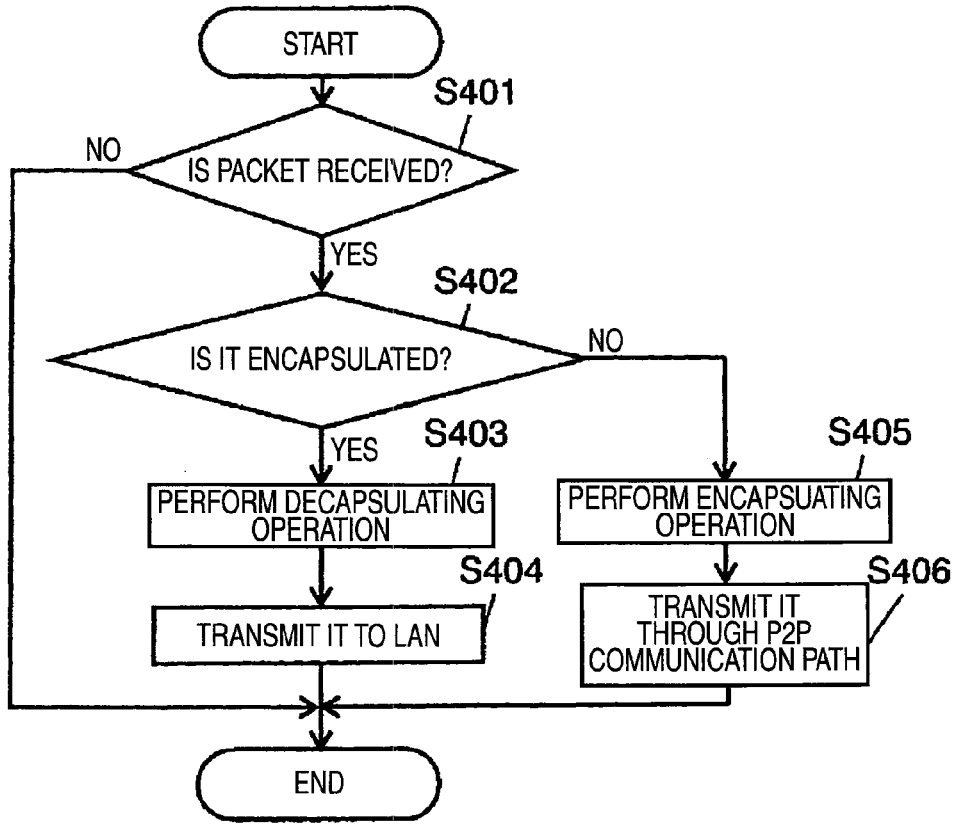
FIG. 7 is a flowchart illustrating another operation of the second tunnel communication device according to the first embodiment.
Figure 8:
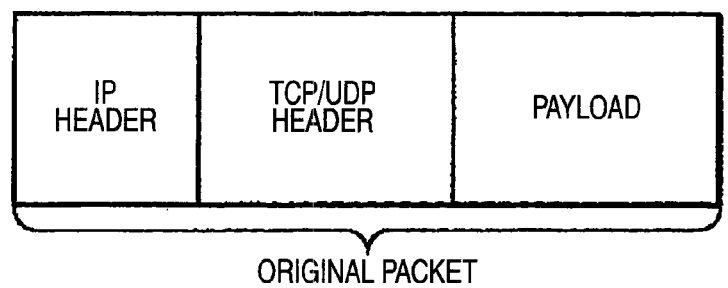
FIG. 8 is a diagram illustrating an encapsulating operation of the information processing system according to the first embodiment.

FIG. 1 is a block diagram illustrating a configuration of an information processing system according to a first embodiment of the invention. FIG. 2 is a block diagram illustrating a configuration of a first tunnel communication device according to the first embodiment. FIG. 3 is a block diagram illustrating a configuration of a second tunnel communication device according to the first embodiment. FIG. 4 is a flowchart illustrating an operation of the first tunnel communication device according to the first embodiment. FIG. 5 is a flowchart illustrating another operation of the first tunnel communication device according to the first embodiment. FIG. 6 is a flowchart illustrating an operation of the second tunnel communication device according to the first embodiment. FIG. 7 is a flowchart illustrating another operation of the second tunnel communication device according to the first embodiment. FIG. 8 is a diagram illustrating an encapsulating operation of the information processing system according to the first embodiment.

Figure 9:
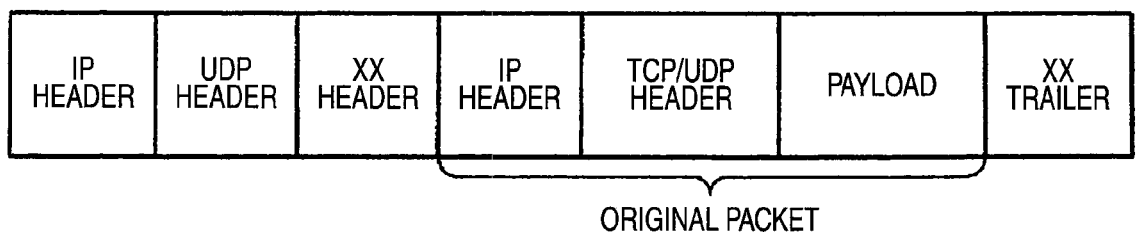
FIG. 9 is a diagram illustrating another encapsulating operation of the information processing system according to the first embodiment.
Figure 10:
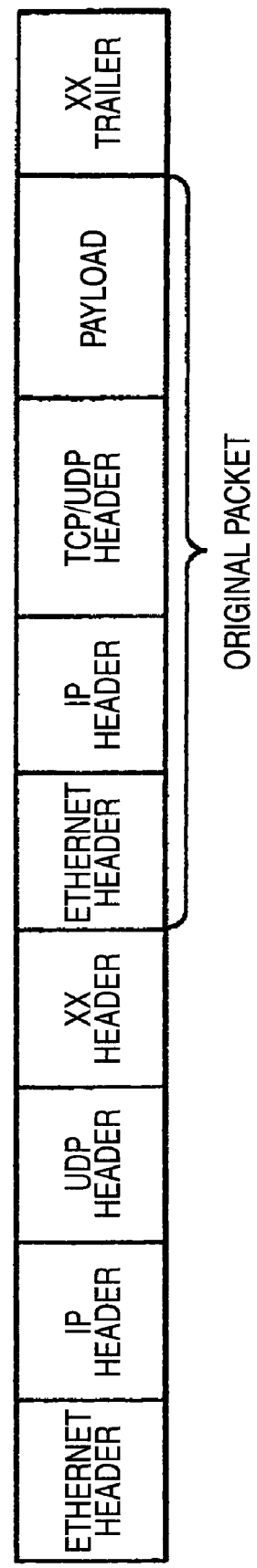
FIG. 10 is a diagram illustrating another encapsulating operation of the information processing system according to the first embodiment.
Figure 11:
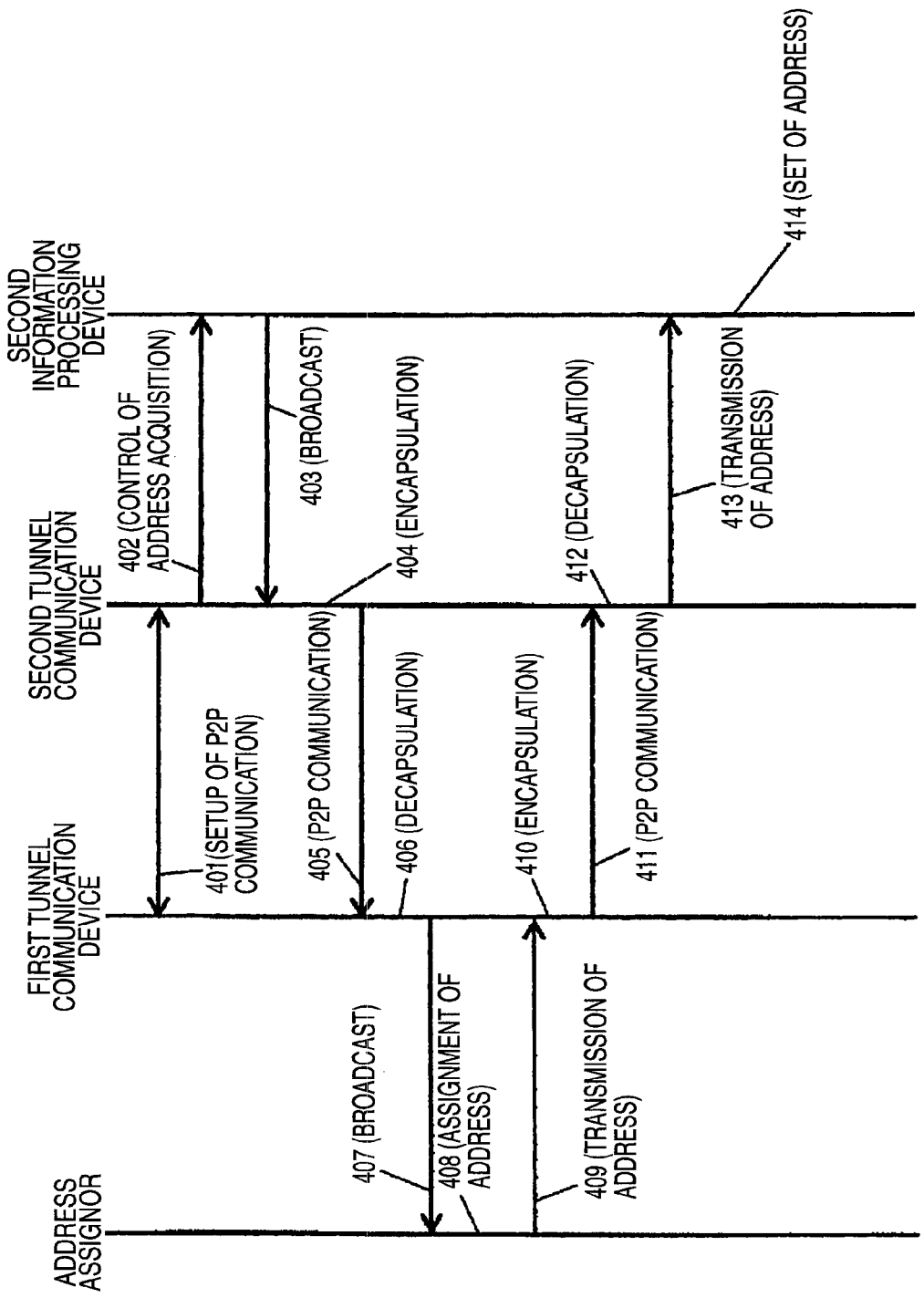
FIG. 11 is a diagram illustrating an inter-device communicating operation of the information processing system according to the first embodiment.
Figure 12:
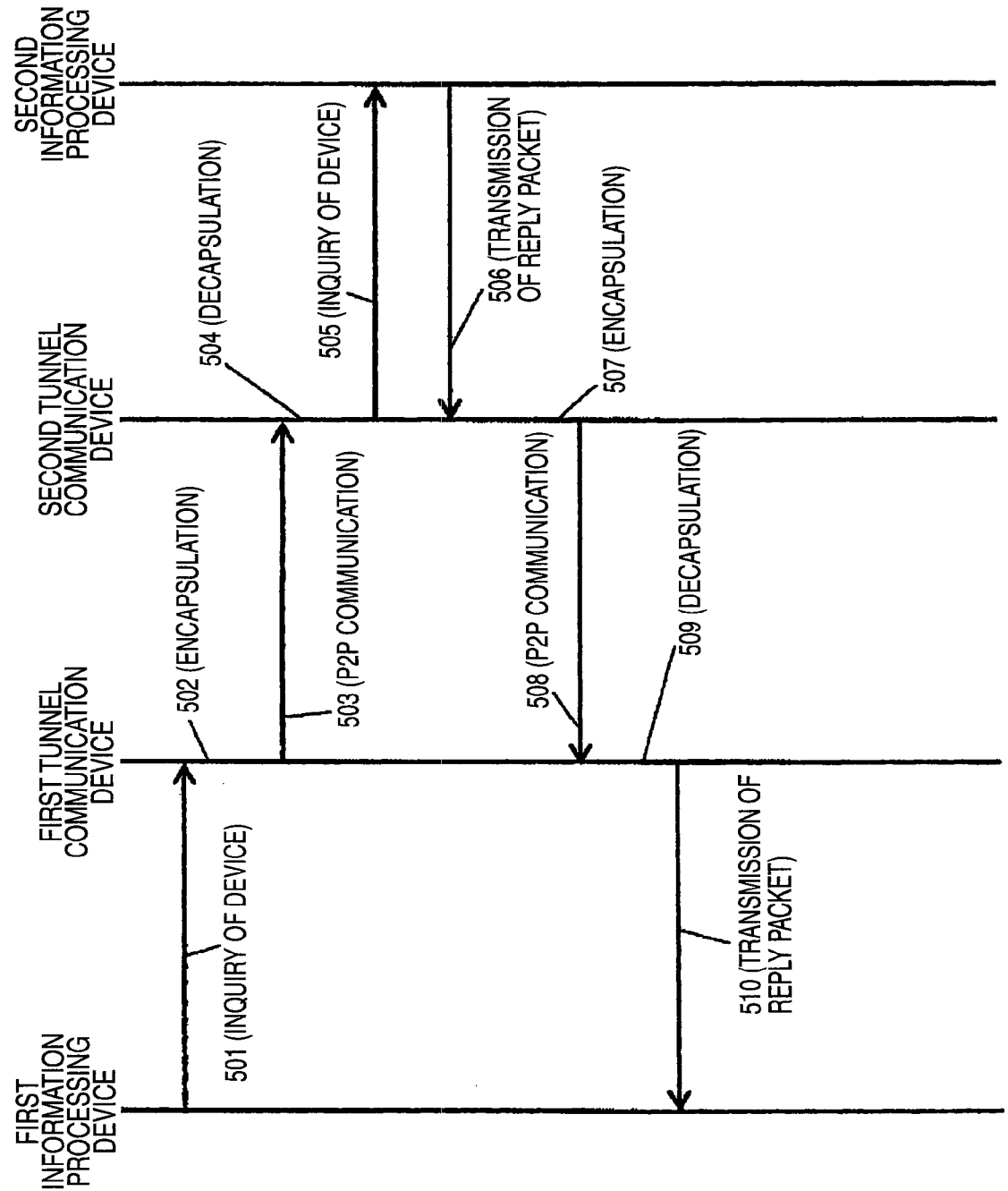
FIG. 12 is a diagram illustrating another inter-device communicating operation of the information processing system according to the first embodiment.
Figure 13:
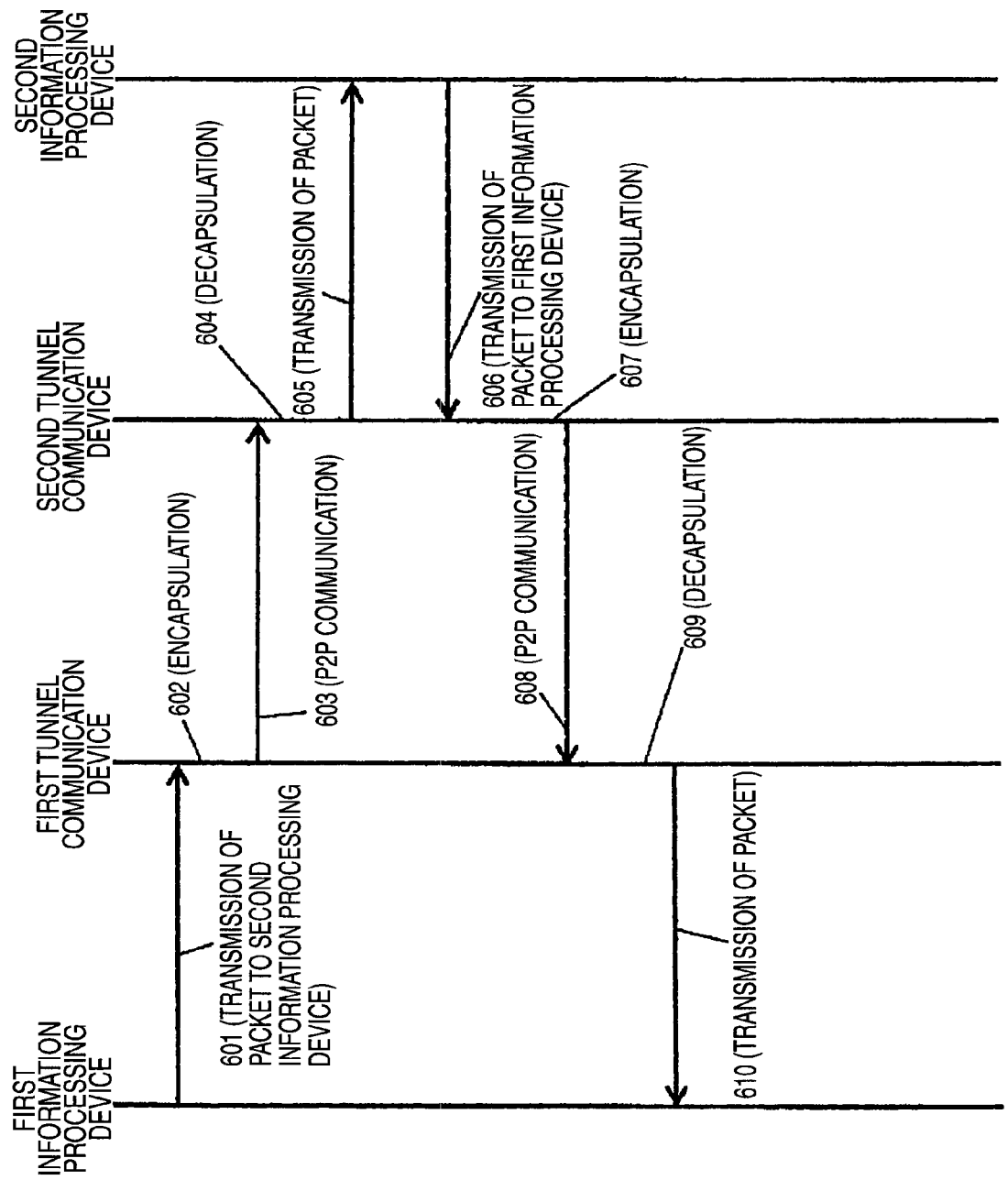
FIG. 13 is a diagram illustrating another inter-device communicating operation of the information processing system according to the first embodiment.
Figure 14:
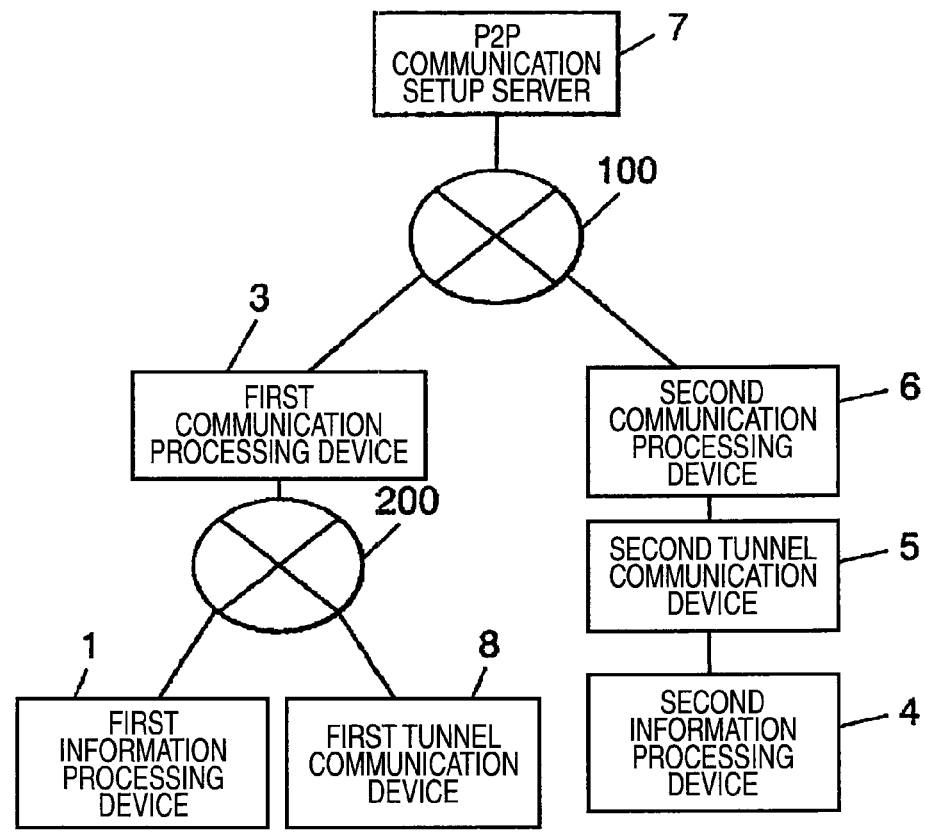
FIG. 14 is a block diagram illustrating another configuration of the information processing system according to the first embodiment.
Figure 15:
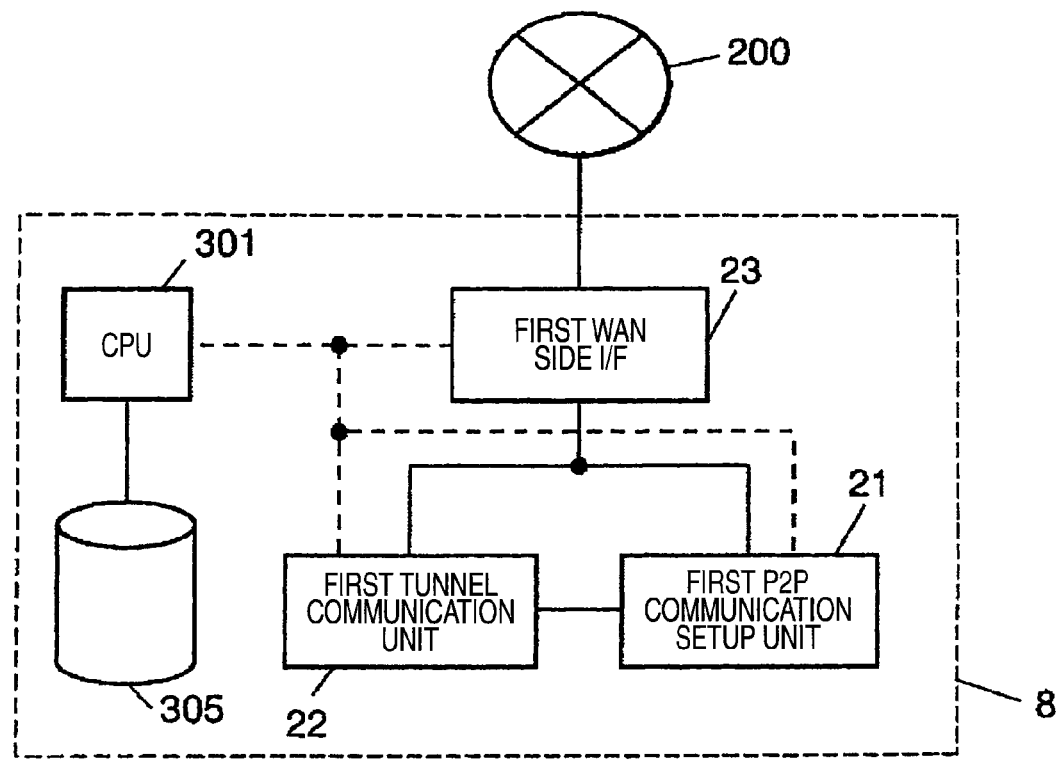
FIG. 15 is a block diagram illustrating another configuration of the first tunnel communication device according to the first embodiment.

FIG. 9 is a diagram illustrating another encapsulating operation of the information processing system according to the first embodiment. FIG. 10 is a diagram illustrating another encapsulating operation of the information processing system according to the first embodiment. FIG. 11 is a diagram illustrating an inter-device communicating operation of the information processing system according to the first embodiment. FIG. 12 is a diagram illustrating another inter-device communicating operation of the information processing system according to the first embodiment. FIG. 13 is a diagram illustrating another inter-device communicating operation of the information processing system according to the first embodiment. FIG. 14 is a block diagram illustrating another configuration of the information processing system according to the first embodiment. FIG. 15 is a block diagram illustrating another configuration of the first tunnel communication device according to the first embodiment.

In FIG. 1, the information processing system includes a first information processing device 1, a first tunnel communication device, 2, a first communication processing device 3, a second information processing device 4, a second tunnel communication device 5, a second communication processing device 6, and a P2P communication setup server 7. The first communication processing device 3, the second communication processing device 6, and the P2P communication setup server 7 are connected to each other through a wired or wireless communication line 100. Here, an example of the communication line 100 includes Internet, Intranet, and a public switched telephone network.

The first information processing device 1 communicates with the second information processing device 4 through the first tunnel communication device 2, the first communication processing device 3, and the like. The first information processing device 1 may be a personal computer (hereinafter, referred to as "PC"), an electric home appliance such as an image recording device and a printer, or a game machine, and is not limited so long as it is a communication device.

The first tunnel communication device 2 can communication with the first information processing device 1 and makes a tunnel communication with the second tunnel communication device 5. As shown in FIG. 2, the first tunnel communication device 2 includes a first P2P communication setup unit 21, a first tunnel communication unit 22, a first wide interface (hereinafter, referred to as "I/F") 23, a first LAN side I/F 24, a first switching unit 25, a central processing unit (hereinafter, referred to as "CPU") 301 as a computer, and a recording medium 305.

The first P2P communication setup unit 21 sets up a P2P communication with the second tunnel communication device 5. Here, the P2P communication is not a communication type using a server such as a server relay communication, but a communication type of a direct communication between devices. The setup of the P2P communication means to set a state in which the P2P communication with the opposite device can be performed. Specifically, the setup of the P2P communication is to find an address of a destination of a packet transmitted from the first tunnel communication device 2 so as to arrive at the opposite device, that is, the second tunnel communication device 5.

In this embodiment, it is assumed that the first P2P communication setup unit 21 acquires an address and a port number of the second communication processing unit 6 which can make a P2P communication with the second tunnel communication device 5. It is also assumed that the setup of the P2P communication is made by the use of the P2P communication setup server 7. The first P2P communication setup unit 21 may be embodied by hardware or may be embodied by software such as a driver for driving a communication device such as a modem or a network card.

The methods of setting up a P2P communication using the communication processing device are disclosed, for example, in Japanese Unexamined Patent Application Publication No. 2004-180003, International Publication No. 2005/041500, International Publication No. 2005/046143, and a non-patent document (J. Rosenberg, J. Weinberger, C. Huitema, and R. Mahy, "STUN—Simple Traversal of User Datagram Protocol (UDP) Through Network Address Translators (NATs)", March, 2003, Network Working Group Request for Comments: 3489, <URL:http://www.ietf.org/rfc/rfc3489.txt>) and was known conventionally. Accordingly, detailed description thereof will be omitted.

The first tunnel communication unit 22 makes a tunnel communication through a path of the P2P communication set up by the first P2P communication setup unit 21. Here, the tunnel communication is to encapsulate a packet and to make a communication by the use of the encapsulated packet. The first tunnel communication unit 22 serves to encapsulate a packet and to decapsulate the encapsulated packet. Here, the encapsulation of a packet means is to add the packet to a payload to form a new packet having a new header.

The header of the new packet, that is, the header of the encapsulated packet, is a header in the same layer as the layer of the header of the packet included in the payload, or a header of a layer higher than the layer. Specific examples of the encapsulation will be described later. In encapsulation, the packet included in the payload may be encoded or may not be encoded. The decapsulation is to take out the packet from the payload of the encapsulated packet. When the packet included in the payload is encoded, the decoding operation may be performed at the time of decapsulation.

Specifically, the first tunnel communication unit 22 encapsulates the packet transmitted from the first information processing device 1, transmits the encapsulated packet through the path of the P2P communication set up by the first P2P communication setup unit 21, and decapsulates the encapsulated packet transmitted from the second tunnel communication device 5 through the path of the P2P communication. The decapsulated packet is transmitted and received by the first information processing device 1.

When the tunnel communication is made through the path of the P2P communication, the first tunnel communication unit 22 encapsulates a packet which is transmitted from the first information processing device 1 and of which the destination is the second information processing device 4, that is, a device at an end of the path of the P2P communication and transmits the encapsulated packet through the path of the P2P communication. The other packets may be encapsulated. That is, in this case, the packets transmitted from the first information processing device 1 may be transmitted through the first WAN side I/F 23 without any change. The first tunnel communication unit 22 may be embodied by hardware or may be embodied by software such as a driver for driving a communication device such as a modem or a network card.

The first P2P communication setup unit 21 and the first tunnel communication unit 22 make a communication, for example, using the same address which is an Internet protocol (hereinafter, referred to as "IP") address or a media access control (hereinafter, referred to as "MAC") address. For example, it can be considered that an IP address, a MAC address, and a port number are set at a position denoted by reference numeral 27 in FIG. 2.

The first WAN side I/F 23 is an interface on the wide network side of the first tunnel communication device 2. The first WAN side I/F 23 is hardware for connection to the wide network, an example of which is a network interface card (hereinafter, referred to as "NIC"). The first tunnel communication unit 22 makes a tunnel communication through the first WAN side I/F 23 and the path of the P2P communication.

The first LAN side I/F 24 is an interface on the local network side of the first tunnel communication device 2. The first LAN side I/F 24 is hardware for connection to the local network, an example of which is an NIC. The first tunnel communication unit 22 makes a communication with the first information processing device 1 through the first LAN side I/F 24.

The first switching unit 25 switches a mode between a tunnel mode and a normal mode. Here, the tunnel mode is a mode in which the first information processing device 1 makes a tunnel communication using the first tunnel communication unit 22. The normal mode is a mode in which the first information processing device 1 does not make the tunnel communication. The first switching unit 25 connects the first LAN side I/F 24 to the right path 25a in FIG. 2 so as to allow the first tunnel communication unit 22 to receive the packet transmitted from the first information processing device 1 in the tunnel mode. On the other hand, the first switching unit 25 connects the first LAN side I/F 24 to the left path 25b in FIG. 2 and disconnects the right path 25a in FIG. 2 therefrom so as to allow the first tunnel communication unit 22 not to receive the packet transmitted from the first information processing device 1 in the normal mode.

The first switching unit 25 may be a manual switch which allows a user to manually switch the connection or a switch which can automatically switch the connection under the control of the CPU 301. The CPU 301 controls the units of the first tunnel communication device 2 by the use of the program recorded in the recording medium 305. When a device connected to the local side of the first communication processing device 3 and the wide side of the first tunnel communication device 2 makes a communication with the first information processing device 1, the first tunnel communication device 2 may operate like a so-called bridge.

The first communication processing device 3 performs communication-related process of the first tunnel communication device 2. The first communication processing device 3 performs the communication-related process between the first tunnel communication device 2 and the second communication processing device 6 or the P2P communication setup server 7. The first communication processing device 3 may be a device having a network address translation (hereinafter, referred to as "NAT") function of translating an address, a device having a firewall function of packet filtering, or may be a device having both functions.

Here, the NAT function includes an address assigning function or a port assigning function. The packet filtering is to select a received packet based on, for example, receiving filter rule. The receiving filter rule includes, for example, an address sensitive filter that receives packets from only the address of which the port transmits the packets, a port sensitive filter that receives packets from only a port from which the packets are transmitted, and a No filter having no filter.

In this embodiment, as shown in FIG. 2, the first communication processing device 3 includes an address assignor 31. Here, the address assignor 31 is device for assigning an address to a device and is, for example, a dynamic host configuration protocol (hereinafter, referred to as "DHCP) server. In this embodiment, the address assignor 31 is the DHCP server. The address of the first information processing device 1 in the tunnel mode is assigned by the address assignor 31. The address of the second information processing device 4 in the tunnel mode is assigned by the address assignor 31 by the use of the tunnel communication through the path of the P2P communication.

The first communication processing device 3 according to this embodiment is a device called a "router." In this embodiment, it is described that the first communication processing device 3 has the address assignor 31. However, the address assignor 31 may not be provided in the first communication processing device 3, so long as it belongs to the same local area network as the local area network to which the first tunnel communication device 2 belongs. For example, the address assignor 31 may be independently connected to the local network of the first communication device 3.

The second information processing device 4 communicates with the first information processing device 1 through the second tunnel communication device 5 and the second communication processing device 6. The second information processing device 4 may be a PC, an electric home appliance such as an image recording device or a printer, or game machine, and is not limited so long as it can make a communication. The second tunnel communication device 5 can communicate with the second information processing device 4 and makes a tunnel communication with the first tunnel communication device 2. As shown in FIG. 3, the second tunnel communication device 5 includes a second P2P communication setup unit 51, a second tunnel communication unit 52, a second WAN side I/F 53, a second LAN side I/F 54, a second switching unit 55, an address acquisition controlling unit 56, a CPU 302 as a computer, and a recording medium 306.

The second P2P communication setup unit 51 sets up a P2P communication with the first tunnel communication device 2. In this embodiment, the second P2P communication setup unit 51 serves to set up the P2P communication by the use of the P2P communication setup server 7 and is the same as the first P2P communication setup unit 21. The second P2P communication setup unit 51 may be embodied by hardware or may be embodied by software such as a driver for driving a communication device such as a modem or a network card.

The second tunnel communication unit 52 makes a tunnel communication through the path of the P2P communication set up by the second P2P communication setup unit 51. The second tunnel communication unit 52 is the same as the first tunnel communication unit 22. Specifically, the second tunnel communication unit 52 encapsulates a packet transmitted from the second information processing device 4, transmits the encapsulated packet through the path of the P2P communication, and decapsulates the encapsulated packet transmitted from the first tunnel communication device 2 through the path of the P2P communication. The decapsulated packet is transmitted and received by the second information processing device 4.

The second tunnel communication unit 52 may encapsulate all the packets transmitted from the second information processing device 4 and transmit the encapsulated packets through the path of the P2P communication, when the tunnel communication is made through the path of the P2P communication. The second tunnel communication unit 52 may be embodied by hardware or may be embodied by software such as a driver for driving a communication device such as a modem or a network card.

The second P2P communication setup unit 51 and the second tunnel communication unit 52 make a communication, for example, using the same address which is an IP address or a MAC address. For example, it can be considered that an IP address, a MAC address, and a port number are set at a position denoted by reference numeral 57 in FIG. 3. The second WAN side I/F 53 is an interface on the wide network side of the second tunnel communication device 5. The second WAN side I/F 53 is hardware for connection to the wide network and is, for example, an NIC. The second tunnel communication unit 52 makes a tunnel communication through the second WAN side I/F 53 and the path of the P2P communication.

The second LAN side I/F 54 is an interface on the local network side of the second tunnel communication device 5. The second LAN side I/F 54 is hardware for connection to the local network and is, for example, an NIC. The second tunnel communication unit 52 communicates with the second information processing device 4 through the second LAN side I/F 54.

The second switching unit 55 switches a mode between the tunnel mode and the normal mode and is the same as the first switching unit 25. The second switching unit 55 connects the second LAN side I/F 54 to the right path in FIG. 3 so as to allow the second tunnel communication unit 52 to receive packets transmitted from the second information processing device 4 in the tunnel mode. On the other hand, the second switching unit 55 connects the second LAN side I/F 54 to the left path in FIG. 3 and disconnect the right path in FIG. 3 therefrom so as to allow the second tunnel communication unit 52 not to receive the packets transmitted from the second information processing device 4 in the normal mode.

The second switching unit 55 may be a manual switch which allows a user to manually switch the connection or a switch which can automatically switch the connection under the control of the CPU 302. In the first tunnel communication device 2, the packet input through the first LAN side I/F 24 may not be encapsulated and transmitted through the first WAN side I/F 23, even when the first switching unit 25 is in the tunnel mode. On the contrary, in the second tunnel communication device 5, all the packets input through the second LAN side I/F 54 are encapsulated by the second tunnel communication unit 52 and transmitted through the second WAN side I/F 53, when the second switching unit 55 is in the tunnel mode.

The address acquisition controlling unit 56 controls the second information processing device 4 to perform the address acquiring process when the second switching unit 55 switches the mode from the normal mode to the tunnel mode. The second information processing device 4 may hold the address of the second information processing device 4 or may not, before the control of the address acquisition controlling unit 56. In this embodiment, a new address is assigned to the second information processing device 4 under this control by the address assignor 31 of the first communication processing device 3. This processing procedure will be described later.

The address acquisition controlling unit 56 temporarily disconnects the second information processing device 4 from the second tunnel communication device 5. That is, the second information processing device 4 may be controlled to perform the address acquiring process by linking down the connection, or the second information processing device 4 may be controlled to perform the address acquiring process by giving an address acquiring instruction to the second information processing device 4. In a specific example of the latter, when the second information processing device 4 acquires an address from the DHCP server, the address acquisition controlling unit 56 may give to the second information processing device 4 an instruction to set the least time of the address of the second information processing device 4 to 0. The CPU 302 controls the units of the second tunnel communication device 5 by the use of the program recorded in the recording medium 306.

The second communication processing device 6 is connected to the first communication processing device 3 through the communication line 100 and performs the communication-related process of the second tunnel communication device 5. The second communication processing device 6 performs the communication-related process between the second tunnel communication device 5 and the first communication processing device 3 or the P2P communication setup server 7. The second communication processing device 6 is the same as the first communication processing device 3 and description thereof is omitted. The P2P communication setup server 7 performs a process of setting up a P2P communication. The P2P communication setup server 7 performs processes necessary to set up the P2P communication described in the above-mentioned document and the like. The number of P2P communication setup server 7 is 1 in this embodiment, the number of P2P communication setup servers 7 may be 2 or more.

For the purpose of convenient explanation, it is shown in FIG. 1 that only one tunnel communication device is connected to the local network sides of the first communication processing device 3 and the second communication processing device 6. However, a device other than the first tunnel communication device 2 and the second tunnel communication device 5 may be connected to the local network sides of the first communication processing device 3 and the second communication processing device 6.

For the purpose of convenient explanation, it is shown in FIG. 1 that only one device is connected to the local network sides of the first tunnel communication device 2 and the second tunnel communication device 5. However, a device other than the first information processing device 1 and the second information processing device 4 may be connected to the local network sides of the first tunnel communication device 2 and the second tunnel communication device 5.

An operation of the first tunnel communication device 2 according to this embodiment will be described with reference to the flowchart shown in FIG. 4. In the flowchart shown in FIG. 4, processes until the tunnel communication is ended after the first tunnel communication device 2 starts the tunnel communication are shown. The first P2P communication setup unit 21 sets up the P2P communication with the second tunnel communication device 5 (step (hereinafter, referred to as "S") 101). The specific process is described in the above-mentioned document and detailed description thereof is omitted.

The first tunnel communication unit 22 makes a tunnel communication through the path of the P2P communication set up by the first P2P communication setup unit 21 (S102). The details of the tunnel communication will be described later. When the tunnel communication is made through the path of the P2P communication, the segment of the first information processing device 1 is equal to the segment of the second information processing device 4. Accordingly, the first information processing device 1 and the second information processing device 4 can make a communication as if they belong to the same local area network.

The first tunnel communication unit 22 determines whether the tunnel communication is ended (S103). The case where the tunnel communication is ended includes a case where an instruction to end the tunnel communication is received from the first information processing device 1 and the like and a case where a tunnel communication through the path of the P2P communication is not made for a predetermined time. When the tunnel communication is not ended, the process of step 102 is performed again. When the tunnel communication is ended, the series of processes are ended. When the tunnel communication is ended, any process of ending the communication may be performed.

The process of making a tunnel communication has been shown in FIG. 4. However, in the normal mode in which the tunnel communication is not made, the first WAN side I/F 23 and the first LAN side I/F 24 are connected to each other by the first switching unit 25 and thus the first tunnel communication device 2 does not perform any process on the packet.

Next, details of the process of step 102 in the flowchart shown in FIG. 4 will be described with reference to FIG. 5. The process of the first tunnel communication unit 22 is shown in the flowchart. The first tunnel communication unit 22 determines whether a packet is received (S201). When it is determined that a packet is received, the process of step 202 is performed and otherwise, the procedure is ended. Here, the operation of the first tunnel communication unit 22 of receiving a packet. As described above, the first tunnel communication unit 22 communicates with the first P2P communication setup unit 21 using the same address and the first tunnel communication unit 22 receives the packet transmitted to the address.

The first tunnel communication unit 22 also receives a packet transmitted to unspecific destinations such as a packet transmitted in a broadcast communication method or a multicast communication method. The first tunnel communication unit 22 also receives the packet transmitted to the second information processing device 4, that is, the packet of which the address of the destination such as an IP address or a MAC address indicates the second information processing device 4.

The first tunnel communication unit 22 determines whether the received packet is an encapsulated packet or a non-encapsulated packet (S202). When it is determined that the received packet is an encapsulated packet, the process of step 203 is performed and when it is determined that the received packet is a non-encapsulated packet, the process of step 205 is performed.

Here, the first tunnel communication unit 22 may determine whether the packet is encapsulated or not on the basis of the format of the packet or on the basis of the transmission path of the packet. In the latter, it may be determined that a packet transmitted to a predetermined port is encapsulated or non-encapsulated. In the latter, for example, when the first tunnel communication device 2 receives the packet from the first WAN side I/F 23, it is determined that the packet is encapsulated. When the first tunnel communication device receives the packet from the first LAN side I/F 24, it is determined that the packet is not encapsulated.

When receiving the encapsulated packet, the first tunnel communication unit 22 decapsulates the received packet (S203). The first tunnel communication unit 22 transmits the decapsulated packet (S204). As a result, the decapsulated packet is transmitted to the device set as the destination of the packet. Then, the series of processes are ended.

When receiving the non-encapsulated packet, the first tunnel communication unit 22 encapsulates the received packet (S205). The destination address in the header of the encapsulated packet is an address of a destination in the path of the P2P communication set up by the first P2P communication setup unit 21. For example, the address is set to an address on the wide side of the second communication processing device 6 and the port number is set to an address of a destination in the header of the encapsulated packet. The address of a transmission source in the header of the encapsulated packet is the address of the first tunnel communication unit 22.

However, when the first communication processing device 3 has the NAT function, the address of the transmission source is translated in the course of transmission. The first tunnel communication unit 22 transmits the encapsulated packet (S206). The packet is transmitted to the first communication processing device 3 through the first WAN side I/F 23. Then, the series of processes are ended.

It is shown in the flowchart of FIG. 5 that the first tunnel communication unit 22 receives a packet, encapsulates the packet or decapsulates the packet, and transmits the resultant packet. However, when the packet received by the first tunnel communication unit 22 is a packet for controlling the first tunnel communication unit 22, the first tunnel communication unit 22 may not transmit the packet. As described above, since the flowchart of FIG. 5 indicates the process on the first tunnel communication unit 22, the communication between a device which is connected to the local side of the first communication processing device 3 and the wide side of the first tunnel communication device 2 and the first information processing device 1 is independently performed. The same is true of the other flowcharts.

An operation of the second tunnel communication device 5 according to this embodiment will be described with reference to the flowchart shown in FIG. 6. In the flowchart of FIG. 6, processes until the tunnel communication is ended after the second tunnel communication device 5 starts the tunnel communication are shown. The second P2P communication setup unit 51 sets up the P2P communication with the first tunnel communication device 2 (S301). The specific process is described in the above-mentioned document and thus detailed description thereof is omitted.

The address acquisition controlling unit 56 controls the second information processing device 4 to perform the process of acquiring an address (S302). The second tunnel communication unit 52 makes a tunnel communication through the path of the P2P communication set up by the second P2P communication set up unit 51 (S303). Details of the tunnel communication will be described later. The second tunnel communication unit 52 determines whether the tunnel communication is ended (S304). When the tunnel communication is not ended, the process of step 303 is performed again. When the tunnel communication is ended, the series of processes are ended.

When the tunnel communication is ended, any process of ending the communication may be performed. The process in the tunnel mode is shown in FIG. 6. However, in normal mode in which the tunnel communication is not made, the second switching unit 55 connects the second WAN side I/F 53 to the second LAN side I/F 54 and thus the second tunnel communication device 5 does not perform any process on the packet.

Next, details of the process of step 303 in the flowchart of FIG. 6 will be described with reference to the flowchart of FIG. 7. The second tunnel communication unit 52 determines whether a packet is received (S401). When it is determined that the packet is received, the process of step 402 and otherwise, the procedure is ended. Here, the operation of the second tunnel communication unit 52 of receiving a packet is described.

As described above, the second tunnel communication unit 52 communicates with the second P2P communication setup unit 51 using the same address and the second tunnel communication unit 52 receives the packet transmitted to the address. The second tunnel communication unit 52 also receives a packet transmitted to unspecific destinations such as a packet transmitted in a broadcast communication method or a multicast communication method. The second tunnel communication unit 52 also receives all the packets transmitted from the second information processing device 4 in the tunnel mode.

The second tunnel communication unit 52 determines whether the received packet is an encapsulated packet or a non-encapsulated packet (S402). When it is determined that the received packet is an encapsulated packet, the process of step 403 is performed and when it is determined that the received packet is a non-encapsulated packet, the process of step 405 is performed. When receiving the encapsulated packet, the second tunnel communication unit 52 decapsulates the received packet (S403). The second tunnel communication unit 52 transmits to the second LAN side I/F 54 the decapsulated packet (S404). As a result, the decapsulated packet is transmitted to the device set as the destination of the packet. Then, the series of processes are ended.

When receiving the non-encapsulated packet, the second LAN side I/F 54 encapsulates the received packet (S405). The destination address in the header of the encapsulated packet is an address of a destination in the path of the P2P communication set up by the second P2P communication setup unit 51. For example, the address is set to an address on the wide side of the first communication processing device 3 and the port number is set to an address of a destination in the header of the encapsulated packet.

The address of a transmission source in the header of the encapsulated packet is the address of the second tunnel communication unit 52. However, when the second communication processing device 6 has the NAT function, the address of the transmission source is translated in the course of transmission. The second tunnel communication unit 52 transmits the encapsulated packet to the second WAN side I/F 53 (S406). The packet is transmitted to the second communication processing device 6 through the second WAN side I/F 53. Then, the series of processes are ended.

It is shown in the flowchart of FIG. 7 that the second tunnel communication unit 52 receives a packet, encapsulates the packet or decapsulates the packet, and transmits the resultant packet. However, when the packet received by the second tunnel communication unit 52 is a packet for controlling the second tunnel communication unit 52, the second tunnel communication unit 52 may not transmit the packet.

Next, an operation of the information processing system according to this embodiment will be described with reference to specific examples. It is assumed that the first communication processing device 3 and the second communication processing device 6 both have an address assignor. It is assumed that the address assignor is the DHCP server. It is assumed that the first information processing device 1 and the second information processing device 4 are both a PC. It is assumed that the first information processing device 1, the first tunnel communication device 2, and the first communication processing device 3 are connected through an Ethernet (registered trademark) cable. It is assumed that the second information processing device 4, the second tunnel communication device 5, and the second communication processing device 6 are connected through the Ethernet cable. That is, it is assumed that the first WAN side I/F 23, the first LAN side I/F 24, the second WAN side I/F 53, and the second LAN side I/F 54 each have an Ethernet port.

First, the first tunnel communication device 2 and the second tunnel communication device 5 are both in the normal mode. At this time, an IP address is assigned to the first information processing device 1 by the address assignor 31 of the first communication processing device 3. An IP address is assigned to the second information processing device 4 by the address assignor (not shown) of the second communication processing device 6. IP addresses are assigned to the first P2P communication setup unit 21 and the first tunnel communication unit 22 of the first tunnel communication device 2 and the second P2P communication setup unit 51 and the second tunnel communication unit 52 of the second tunnel communication device 5 by the address assignor 31 of the first communication processing device 3 and the address assignor of the second communication processing device 6. The IP addresses of the first information processing device 1, the first P2P communication setup unit 21, etc. of the first tunnel communication device 2, and the first communication processing device 3 are as follows.

First information processing device 1: 192.168.0.10
First P2P communication setup unit 21, first tunnel communication unit 22: 192.168.0.2
Local side of first communication processing device 3: 192.168.0.1
Wide side of first communication processing device 3: 202.224.135.10
Second information processing device 4: 192.168.1.10
Second P2P communication setup unit 51, second tunnel communication unit 52: 192.168.1.2
Local side of second communication processing device 6: 192.168.1.1
Wide side of second communication processing device 6: 155.32.10.10

Next, it is assumed that a user of the first tunnel communication device 2 operates the first switching unit 25 to switch the mode from the normal mode to the tunnel mode. It is also assumed that a user of the second tunnel communication device 5 operates the second switching unit 55 to switch the mode from the normal mode to the tunnel mode. This switching may be physically performed by the user's operating a switch or button of the first switching unit 25, or may be electrically performed by the user's instruction to the first information processing device 1.

When it is detected that the first switching unit 25 and the second switching unit 55 are operated into the tunnel mode, the first P2P communication setup unit 21 and the second P2P communication setup unit 51 performs a process of setting up a P2P communication between the first tunnel communication device 2 and the second tunnel communication device 5. The first P2P communication setup unit 21 and the second P2P communication setup unit 51 have the address of the P2P communication setup server 7 and sets up the P2P communication by accessing the P2P communication setup server 7 using the address.

The first P2P communication setup unit 21 and the second P2P communication setup unit 51 have device identification information for identifying the opposite tunnel communication device and sets up the P2P communication by identifying the opposite communication device using the device identification information. The process of storing the device identification information of the tunnel communication device in the first tunnel communication device 2 and the second tunnel communication device 5 does not matter. For example, a user may store the device identification information in the first tunnel communication device 2, etc. through an input device or a recording medium. Alternatively, the first tunnel communication device 2 and the second tunnel communication device 5 may form a set at the time of shipping and may store the device identification information of the opposite device in advance.

The process of allowing the first P2P communication setup unit 21 of the first tunnel communication device 2 and the second P2P communication setup unit 51 of the second tunnel communication device 5 to set up the P2P communication was known in the past and detailed description thereof is omitted. In the process of setting up the P2P communication, it is assumed that the first P2P communication setup unit 21 acquired an IP address "155.32.10.10" and a port number "22222" of the wide side of the second communication processing device 6 used in the P2P communication and gave them to the first tunnel communication unit 22. Similarly, it is assumed that the second P2P communication setup unit 51 acquired an IP address "202.224.135.10" and a port number "11111" of the wide side of the first communication processing device 3 used in the P2P communication and gave them to the second tunnel communication unit 52 (S101 and S301).

Next, operations of encapsulating and decapsulating a packet in the first tunnel communication unit 22 and the second tunnel communication unit 52 are described with reference to FIGS. 8 to 10. First, it is assumed that a before-encapsulation packet as an "original packet" is as shown in FIG. 8. As shown in FIG. 9, the first tunnel communication unit 22, etc. adds an XX header and an XX trailer to the original packet and adds a user datagram protocol (hereinafter, referred to as "UDP") header and an IP header thereto, thereby encapsulating the original packet.

Here, the XX header and the XX trailer include, for example, an IP encapsulating security payload (hereinafter, referred to as "ESP") header, an authentication header (hereinafter, referred to as "AH"), and an ESP trailer and are added to encode the original packet shown in FIG. 8. The XX header and the XX trailer may be omitted. Only one of the XX header and the XX trailer may be added. Two or more of the XX header and the XX trailer may be added.

The address and the port number of the opposite communication processing device in the P2P communication are set in the IP header and the UDP header after encapsulation. For example, when the first tunnel communication unit 22 encapsulates the packet, the IP address of a destination included in the IP header of the encapsulated packet is the IP address "155.32.10.10" of the second communication processing device 6 and the port number of the destination included in the UDP header of the encapsulated packet is the port number "22222" of the second communication processing device 6. The second tunnel communication unit 52 performs the encapsulation similarly.

The original packet may be a packet having an Ethernet header. In general, the original packet is called a "frame", but is called a "packet" in this specification. In this case, the encapsulated packet is as shown in FIG. 10. The MAC address included in the Ethernet header is the MAC address acquired by an address resolution protocol (hereinafter, referred to as "ARP").

The acquisition of the MAC address in the ARP will be described later.

It has been shown in FIGS. 9 and 10 that the encapsulation is performed by the use of the UDP header. However, when the setup of the path of the P2P communication is made using a transmission control protocol (hereinafter, referred to as "TCP") without using the UDP packet, the encapsulation may be performed by the use of the TCP header.

Next, a process of the second information processing device 4 of acquiring an address using the address assignor 31 will be described with reference to FIG. 11. As described above, when the P2P communication is set up between the first tunnel communication device 2 and the second tunnel communication device 5 (401 of FIG. 11), the address acquisition controlling unit 56 controls the second information processing device 4 to acquire an address by lining down the communication with the second information processing device 4 (402 of FIG. 11) (S302).

Then, the second information processing device 4 transmits a packet of a broadcast communication type for requiring an IP address (403 of FIG. 11). The IP address of the destination of the packet is "192.168.1.255" and the MAC address is "FF-FF-FF-FF-FF-FF." It is assumed that the network address of the local side of the second communication processing device 6 is "192.168.1."

The second tunnel communication unit 52 receives the packet transmitted in the broadcast communication type (S401). Since the packet is not encapsulated (S402), the packet is encapsulated using the IP address and the port number of the wide side of the first communication processing device 3 received from the second P2P communication setup unit 51 as the address and the port number of the destination as shown in FIG. 9 (404 of FIG. 11) (S405). The second tunnel communication unit 52 transmits the encapsulated packet (405 of FIG. 11) (S406).

The packet is translated in address by the second communication processing device 6 and is then transmitted to the first communication processing device 3. Then, the packet is translated in address by the first communication processing device 3 and is transmitted to the first tunnel communication device 2. The first tunnel communication unit 22 of the first tunnel communication device 2 receives the encapsulated packet transmitted from the second tunnel communication device 5 through the path of the P2P communication (S201). The, since the packet is encapsulated (S202), the packet included in the payload of the packet is extracted and decapsulated (406 of FIG. 11) (S203).

The first tunnel communication unit 22 transmits to the local network the decapsulated packet (407 of FIG. 11) (S204). The transmitted packet is the same packet as the packet transmitted from the second information processing device 4 (403 of FIG. 11) and is a packet of a broadcast communication type. The packet is transmitted to the first information processing device 1 or the first communication processing device 3. The address assignor 31 of the first communication processing device 3 receives the packet and determines the IP address "192.168.0.11" to be assigned to the second information processing device 4 (408 of FIG. 11). Then, a packet of a broadcast communication type including the IP address in the payload thereof is constituted and transmitted to the local network of the first communication processing device 3 (409 of FIG. 11).

The first tunnel communication unit 22 receives the packet transmitted in the broadcast communication type (S201). Since the packet is not encapsulated (S202), the packet is encapsulated using the IP address and the port number of the wide side of the second communication processing device 6 received from the first P2P communication setup unit 21 as the address and the port number of the destination as shown in FIG. 9 (410 of FIG. 11) (S205). The first tunnel communication unit 22 transmits the encapsulated packet (411 of FIG. 11) (S206).

The packet is translated in address by the first communication processing device 3 and is then transmitted to the second communication processing device 6. Then, the packet is translated in address by the second communication processing device 6 and is transmitted to the second tunnel communication device 5. The second tunnel communication unit 52 of the second tunnel communication device 5 receives the encapsulated packet transmitted from the first tunnel communication device 2 through the path of the P2P communication (S401). The, since the packet is encapsulated (S402), the packet included in the payload of the packet is extracted and decapsulated (412 of FIG. 11) (S403).

The second tunnel communication unit 52 transmits to the local network the decapsulated packet (413 of FIG. 11) (S404). The decapsulated packet is transmitted to the second information processing device 4. The transmitted packet is the same packet as the packet transmitted from the address assignor 31 in 409 of FIG. 11 and is a packet of a broadcast communication type.

The packet is received by the second information processing device 4. The second information processing device 4 sets the IP address of the second information processing device 4 to the address "192.168.0.11" included in the payload of the received packet (414 of FIG. 11). In this way, the first information processing device 1 and the second information processing device 4 can communicate with each other as devices in the same segment.

Next, a method of allowing the first information processing device 1 to acquire the IP address of the second information processing device 4 will be described with reference to FIG. 12. Here, it will be described that a simple service discover protocol (hereinafter, referred to as "SSDP") of a universal plug and play (hereinafter, referred to as "UPnP")-audio visual (hereinafter, referred to as "AV") standard is used. Accordingly, it is assumed that the first information processing device 1 and the second information processing device 4 are devices corresponding to the UPnP. First, the first information processing device 1 transmits a packet for making an inquiry about a device to unspecific destinations (501 of FIG. 12).

The packet is an inquiry packet of the SSDP of the UPnP-AV standard. The packet is transmitted in the IP multicast communication type. The packet is received by the first tunnel communication unit 22 and is encapsulated similarly to the broadcast communication type shown in FIG. 11 (502 of FIG. 12). The first tunnel communication unit 22 transmits the encapsulated packet to the second tunnel communication device 5 through the path of the P2P communication (503 of FIG. 12). The second tunnel communication unit 52 of the second tunnel communication device 5 receives and decapsulates the packet (504 of FIG. 12).

The second tunnel communication unit 52 transmits the decapsulated packet for making an inquiry about a device (505 of FIG. 12). The packet is transmitted to the second information processing device 4. The second information processing device 4 constitutes a reply packet in response to the inquiry packet and transmits the constituted reply packet (506 of FIG. 12). The packet is transmitted in a unicast communication type. The reply packet includes the IP address and the host name of the second information processing device 4.

The packet is received and encapsulated by the second tunnel communication unit 52 (507 of FIG. 12). The second tunnel communication unit 52 transmits the encapsulated packet to the first tunnel communication device 2 through the path of the P2P communication (508 of FIG. 12). The first tunnel communication unit 22 of the first tunnel communication device 2 receives and decapsulates the packet (509 of FIG. 12). The first tunnel communication unit 22 transmits the decapsulated packet (510 of FIG. 12).

When the packet is received by the first tunnel communication device 1, the first tunnel communication device 1 can know the host name and the IP address of a device in the same segment. It is shown in FIG. 12 that the first information processing device 1 knows the IP address and the host name of the second information processing device 4. However, when another device is present in the same segment as the first information processing device 1, the reply from the device is also received by the first information processing device 1.

Although it is shown in FIG. 12 that the information processing device replies to the inquiry packet of the SSDP, the inquiry packet of the SSDP may not be transmitted in the tunnel communication, but another device may reply thereto. For example, the second information processing device 4 register the address of the first communication processing device 3, and the first communication processing device 3 may reply in proxy to the inquiry from the first information processing device 1, instead of the second information processing device 4.

Here, although it has been described above that the inquiry about the IP address is made using the SSDP of the UPnP-AV standard, the inquiry about the IP address may be made using another different method. For example, a session may be set up by a NetBIOS Extended User Interface (hereinafter, referred to as "NetBEUI") and then the first information processing device 1 may acquire the IP address, etc. of the second information processing device 4 in a data communication of the NetBEUI. The first information processing device 1 may acquire the IP address of the second information processing device 4 by the use of another method.

In general, it is considered that the first information processing device 1 relatively often wants the communication with the second information processing device 4 which is the same kind of device as the first information processing device 1. For example, when the first information processing device 1 is a PC, it is considered that the first information processing device 1 wants the communication with the second information processing device 4 which is a PC. When the first information processing device 1 is a game machine, it is considered that the first information processing device 1 wants the communication with the second information processing device 4 which is the same kind of game machine.

Accordingly, when the first information processing device 1 and the second information processing device 4 have a function of finding out the opposite device and acquiring an address of the opposite in the same segment, it is considered that the opposite address can be acquired similarly in the tunnel communication and the first information processing device 1 and the second information processing device 4 can inform each other of the IP address using the function.

For example, the IP address of the second information processing device 4 may be transmitted from the user of the second information processing device 4 to the user of the first information processing device 1 by the use of a communication method such as an electronic mail or a server relay, whereby the first information processing device 1 knows the IP address of the second information processing device 4. Here, it has been described that the first information processing device 1 acquires the address of the second information processing device 4, the second information processing device 4 can acquire the address of the first information processing device 1 similarly.

Before describing the communication between the first information processing device 1 and the second information processing device 4, a process of acquiring the MAC address using the ARP will be described. Here, two patterns of (A) a pattern in which an ARP request packet and an ARP response packet are encapsulated and (B) a pattern in which the ARP request packet and the ARP response packet are not encapsulated but the tunnel communication unit replies in proxy will be described.

(A) Pattern in which the ARP Packet is Encapsulated

When the first information processing device 1 transmits the ARP request packet to the IP address of the second information processing device 4 in the broadcast communication manner, the first tunnel communication unit 22 encapsulates the ARP request packet and transmits the encapsulated packet to the second tunnel communication device 5. In this case, the decapsulation is performed by the second tunnel communication device 5 and the second information processing device 4 replies to the ARP request packet.

The ARP response packet transmitted from the second information processing device 4 is encapsulated by the second tunnel communication device 5 and is transmitted to the first tunnel communication device 2. The first tunnel communication device 2 decapsulates the packet and transmits the ARP response packet to the first information processing device 1. In this way, the first information processing device 1 can know the MAC address of the second information processing device 4 and when a packet is transmitted to the second information processing device 4, the MAC address can be used as the MAC address of a destination.

In this way, when the ARP packet is encapsulated, the first tunnel communication unit 22 stores the MAC address of the second information processing device 4. When a packet of which the destination address is the stored MAC address of the second information processing device 4 is transmitted, the first tunnel communication unit may receive the transmitted packet (S201). In this case, the first tunnel communication unit 22 may determine whether the destination is the second information processing device 4 on the basis of the IP address of the destination of the packet.

The first tunnel communication unit 22 may encapsulate the received packet every Ethernet header (see FIG. 10) or may decapsulate and then encapsulate the Ethernet header (see FIG. 9). In the former, the second tunnel communication unit 52 decapsulates the packet and then transmits the decapsulated packet and the second information processing device 4 receives the packet. In the latter, the second tunnel communication unit 52 first performs the decapsulation and then acquires the MAC address corresponding to the IP address of the destination, that is, the IP address of the second information processing device 4, using the ARP. The packet having the Ethernet header including the acquired MAC address is transmitted and is received by the second information processing device 4.

When the ARP packet is encapsulated, the first tunnel communication unit 22 can acquire the MAC address or the IP address of the second information processing device 4 connected to the second tunnel communication device 5 by acquiring the MAC address or the IP address included in the ARP response packet. The acquired address is stored, whereby it can be determined whether the destination of the packet transmitted from the first information processing device 1 is the second information processing device 4. It can be also determined whether the packet transmitted from the first information processing device 1 is received.

(B) Pattern in which the Tunnel Communication Unit Replies in Proxy (B-1) A case where the first tunnel communication unit 22 knows the correlation between the MAC address and the IP address of the second information processing device 4 will be first described. In this case, when the first information processing device 1 transmits the ARP request packet to the IP address of the second information processing device 4 in the broadcast communication manner, the first tunnel communication unit 22 can know from the ARP request packet that the IP address in inquiry is the address of the second information processing device 4.

Accordingly, the ARP request packet is received and the ARP response packet having the MAC address corresponding to the IP address included in the ARP request packet is transmitted to the first information processing device 1. As a result, the first information processing device 1 can know the actual MAC address of the second information processing device 4. Thereafter, the packet transmitted from the first information processing device 1 to the second information processing device 4 may be received and encapsulated every Ethernet header by the first tunnel communication unit 22. It is similar to the description of (A) that the Ethernet header may be decapsulated and encapsulated.

(B-2) Next, a case where the first tunnel communication unit 22 returns an address other than the actual MAC address of the second information processing device 4 as the MAC address of the second information processing device 4 will be described. Here, it is assumed that the first tunnel communication unit 22 knows the IP address of the second information processing device 4. The first information processing device 1 transmits the ARP request packet to the IP address of the second information processing device 4 in the broadcast communication manner. The first tunnel communication unit 22 can know from the ARP request packet that the IP address in inquiry is the address of the second information processing device 4.

The ARP request packet is received and the ARP response packet thereto is transmitted to the first information processing device 1. The MAC address included in the ARP response packet may be the MAC address used by the first tunnel communication unit 22 or may be other MAC address. However, the MAC address is a MAC address which the first information processing device 1 cannot acquire using the ARP.

When the MAC address is other MAC address, the first tunnel communication unit 22 stores the MAC address which the first tunnel communication unit 22 has transmitted along with the ARP response packet. When a packet of which the destination address is set to the stored MAC address is transmitted, the packet may be received as the packet of the destination address is the second information processing device 4 (S201). In this case, the first tunnel communication unit 22 may determine whether the destination is the second information processing device 4 on the basis of the IP address of the destination of the packet.

The first tunnel communication unit 22 may encapsulate the received packet every Ethernet header, or may decapsulate the Ethernet header and encapsulate the resultant packet (see FIG. 9). In the former, when the first tunnel communication unit 22 knows the actual MAC address of the second information processing device 4, the MAC address of the destination included in the Ethernet header may be changed to the actual MAC address of the second information processing device 4. Alternatively, the MAC address of the destination included in the Ethernet header may be changed to the actual MAC address of the second information processing device 2 by the second tunnel communication unit 52.

On the other hand, in the latter, the second tunnel communication unit 52 performs the decapsulation, then acquires the MAC address corresponding to the IP address of the destination, that is, the IP address of the second information processing device 4, by the use of the ARP, and transmits the packet having the Ethernet header including the acquired MAC address, whereby the packet is received by the second information processing device 4.

Next, a method of allowing the first tunnel communication unit 22 to know the correlation between the MAC address and the IP address of the second information processing device 4 and a method of allowing the first tunnel communication unit 22 to know the IP address of the second information processing device 4 will be described. Here, two patterns of (C) a pattern in which the second tunnel communication device 5 acquires the information and transmits the information to the first tunnel communication device 2 through the path of the P2P communication or the server relay and (D) a pattern in which the first tunnel communication unit 22 acquires the information by transmitting a predetermined packet to the second tunnel communication device 5 are described.

(C) Pattern in which the Second Tunnel Communication Device 5 Acquires (C-1) A broadcast packet is used.

The second tunnel communication device 5 can know the IP address or the MAC address of a device connected thereto by transmitting a packet to a local-side device connected thereto in a broadcast communication manner or a multicast communication manner and receiving the reply packet in response to the transmitted packet. For example, a ping packet may be transmitted to a broadcast address, the inquiry packet of the SSDP may be transmitted, a packet of a broadcast communication type which is the ARP request packet may be transmitted, or another method may be used.

When the ARP request packet is transmitted and the network address is "192.168.1", the second tunnel communication device 5 transmits the ARP request packets of which the address is from "192.168.1.1" to "192.168.1.254" and can know the IP address or the MAC address of a device connected thereto depending on the address from which the reply packet is received.

(C-2) A packet of a unicast communication type is used.

The second tunnel communication device 5 can know the IP address or the MAC address of a device connected thereto by transmitting a packet to the local network in a unicast communication manner and receiving the replay packet in response to the transmitted packet. For example, when the local network address of the second tunnel communication device 5 is "192.168.1", the second tunnel communication device 5 transmits ping packets of which the destination address is from "192.168.1.1" to "192.168.1.254" to the local side and can know the IP address or the MAC address of a device connected to the second tunnel communication device 5 depending on the address from which the reply packet is received. The IP address, etc. may be known by the use of a packet other than the ping packets, whether the reply packet in response to the packet is received, or another method may be used.

(C-3) A packet is monitored.

The second tunnel communication device 5 can know the IP address or the MAC address of a device connected thereto by acquiring an address from the header of the packet transmitted from the local-side device. Since the second tunnel communication device 5 generally stores the MAC addresses of the devices connected to the ports, the second tunnel communication device can know the MAC address of the local-side device. Accordingly, the second tunnel communication device 5 can know the IP address of the device connected to the local side of the second tunnel communication device 5 or the correlation between the IP address and the MAC address thereof by acquiring the IP address corresponding to the MAC address through monitoring.

The second tunnel communication device 5 may know the information from an ARP table or may know the information by monitoring the request packets to the DHCP server or the replay packets from the DHCP server, and another method may be used. As described above, the information acquired in this way is transmitted to the first tunnel communication device 2 through the path of the P2P communication or the server relay and the information is used by the first tunnel communication unit 22.

(D) Pattern in which the First Tunnel Communication Unit 22 Acquires

The same packet as the second tunnel communication device 5 having transmitted in (C-1) and (C-2) is constructed, encapsulated, and transmitted through the path of the P2P communication by the first tunnel communication unit 22. By allowing the first tunnel communication unit 22 to receive the replay packet in response to the packet through the path of the P2P communication, the first tunnel communication unit 22 can know the IP address the device connected to the local side of the second tunnel communication device 5. In this case, since the first tunnel communication unit 22 merely encapsulates and transmits the packets, the first tunnel communication unit 22 can be made not to acquire the information of the device connected to the first tunnel communication device 2.

The first tunnel communication unit 22 can know which address is assigned to the device connected to the local side of the second tunnel communication device 5, by monitoring the request packet of the DHCP encapsulated and transmitted through the second tunnel communication device 5 and the replay packet in response thereto. Accordingly, the first tunnel communication unit 22 may acquire the address of the information processing device connected to the second tunnel communication device 5 by monitoring the packet of DHCP or the like. Here, although it has been described that the first information processing device 1 performs the ARP process, the same is true when the second information processing device 4 may perform the ARP process.

Next, the communication between the first information processing device 1 and the second information processing device 4 will be described with reference to FIG. 13. Details of the process of acquiring the MAC address of the destination in the ARP are not described. First, the first information processing device 1 constructs a packet using the IP address of the second information processing device 4 as the destination address and transmits the constructed packet (601 of FIG. 13). As described above, the MAC address of the destination of the packet may be the actual MAC address of the second information processing device 4 or another MAC address. The first tunnel communication unit 22 determines whether the destination of the packet is the second information processing device 4 on the basis of the IP address or the MAC address as the address of the packet transmitted from the first information processing device 1.

When the destination of the packet is the second information processing device 4, the packet is received (S201). The first tunnel communication unit 22 encapsulates the packet (602 of FIG. 13). The encapsulated packet is transmitted to the second tunnel communication device 5 through the path of the P2P communication (603 of FIG. 13). The second tunnel communication unit 52 of the second tunnel communication device 5 decapsulates the received packet when receiving the packet (604 of FIG. 13). Then, the second tunnel communication unit 52 transmits the decapsulated packet to the second information processing device 4 (605 of FIG. 13).

Next, the transmission of a packet from the second information processing device 4 to the first information processing device 1 will be described. The second information processing device 4 constructs a packet using the IP address of the first information processing device 1 as the destination address and transmits the constructed packet (606 of FIG. 13). Similarly to the transmission of the packet from the first information processing device 1 to the second information processing device 4, the MAC address of the destination may be the actual MAC address of the first information processing device 1 or may be another MAC address.

The transmitted packet is received by the second tunnel communication unit 52 (S401). The second tunnel communication unit 52 encapsulates the packet (607 of FIG. 13). The encapsulated packet is transmitted to the first tunnel communication device 2 through the path of the P2P communication (608 of FIG. 13). The first tunnel communication unit 22 of the first tunnel communication device 2 decapsulates the received packet when receiving the packet (609 of FIG. 13). Then, the first tunnel communication unit 22 transmits to the first information processing device 1 the decapsulated packet (610 of FIG. 13).

When the first information processing device 1 transmits a packet to a server and the like connected to the communication line 100, the packet is not received by the first tunnel communication unit 22 but by the first tunnel communication device 3 and is transmitted to the communication line 100. Accordingly, the first information processing device 1 can access Internet and the like. When the second information processing device 4 transmits a packet to a server and the like connected to the communication line 100, the packet is transmitted to the first tunnel communication device 2 in the tunnel communication and is transmitted from the first tunnel communication device 2 to the communication line 100 through the first communication processing device 3. Accordingly, the second information processing device 4 can also access the Internet.

As described above, in the information processing system according to this embodiment, the first information processing device 1 and the second information processing device 4 can communicate with each other as if they are in the same segment, and thus can perform a file sharing process and the like therebetween. The communication therebetween is made through the communication line 100 such as the Internet, but the packet via the communication line 100 is encapsulated. Accordingly, when an encoding process is performed by the encapsulation, the communication details between the first information processing device 1 and the second information processing device 4 is not leaked from the communication line 100, thereby enhancing the security.

Since the first tunnel communication device 2 and the second tunnel communication device 5 perform the process of setting the first information processing device 1 and the second information processing device 4 to the same segment, the first information processing device 1 and the second information processing device 4 may not perform the process of setting both to the same segment. Accordingly, the first information processing device 1, etc. may not be a device for performing a particular process such as the setup of the tunnel communication or the P2P communication, but may be a conventional PC or a game machine for making a communication through a network. As a result, by connecting the conventional PC, etc. to the first communication processing device 3 such as a so-called router through the first tunnel communication device 2, plural devices which are not actually in the same segment can be set to the same segment without a user's making a complex setup, thereby improving the user's convenience.

Although it has been described in this embodiment that the first tunnel communication device 2 has two interfaces of the WAN side I/F and the LAN side I/F, the first tunnel communication device 2 may not have the LAN side I/F. Specifically, the information processing system according to this embodiment may have the configuration shown in FIG. 14. The first tunnel communication device 8 shown in FIG. 14 is constructed as shown in FIG. 15. In FIG. 15, the first tunnel communication device 8 includes a first P2P communication setup unit 21, a first tunnel communication unit 22, a first WAN side I/F 23, a CPU 301, and a recording 305. The configurations thereof are similar to the above-described ones and thus description thereof will be omitted.

A communication line 200 is a local-side network of the first communication processing device 3. When a packet is transmitted from the first information processing device 1 to the second information processing device 4, the packet is transmitted from the first information processing device 1 to the first tunnel communication device 8. The packet is encapsulated by the first tunnel communication device 8 and is transmitted to the second tunnel communication device 5 through the path of the P2P communication. The packet is decapsulated by the second tunnel communication device 5 and then is transmitted to the second information processing device 4. When a packet is transmitted from the second information processing device 4 to the first information processing device 1, similarly, the packet transmitted from the second information processing device 4 is transmitted to the first information processing device 1 through the second tunnel communication device and the first tunnel communication device 8.

In this embodiment, the first tunnel communication device 2 may include a layer 2 switch or a layer 3 switch so as not to transmit an unnecessary packet to the first tunnel communication unit 22. For example, the layer 2 switch may be provided at the position denoted by reference numeral 26 in FIG. 2.

Second Embodiment

Figure 16:
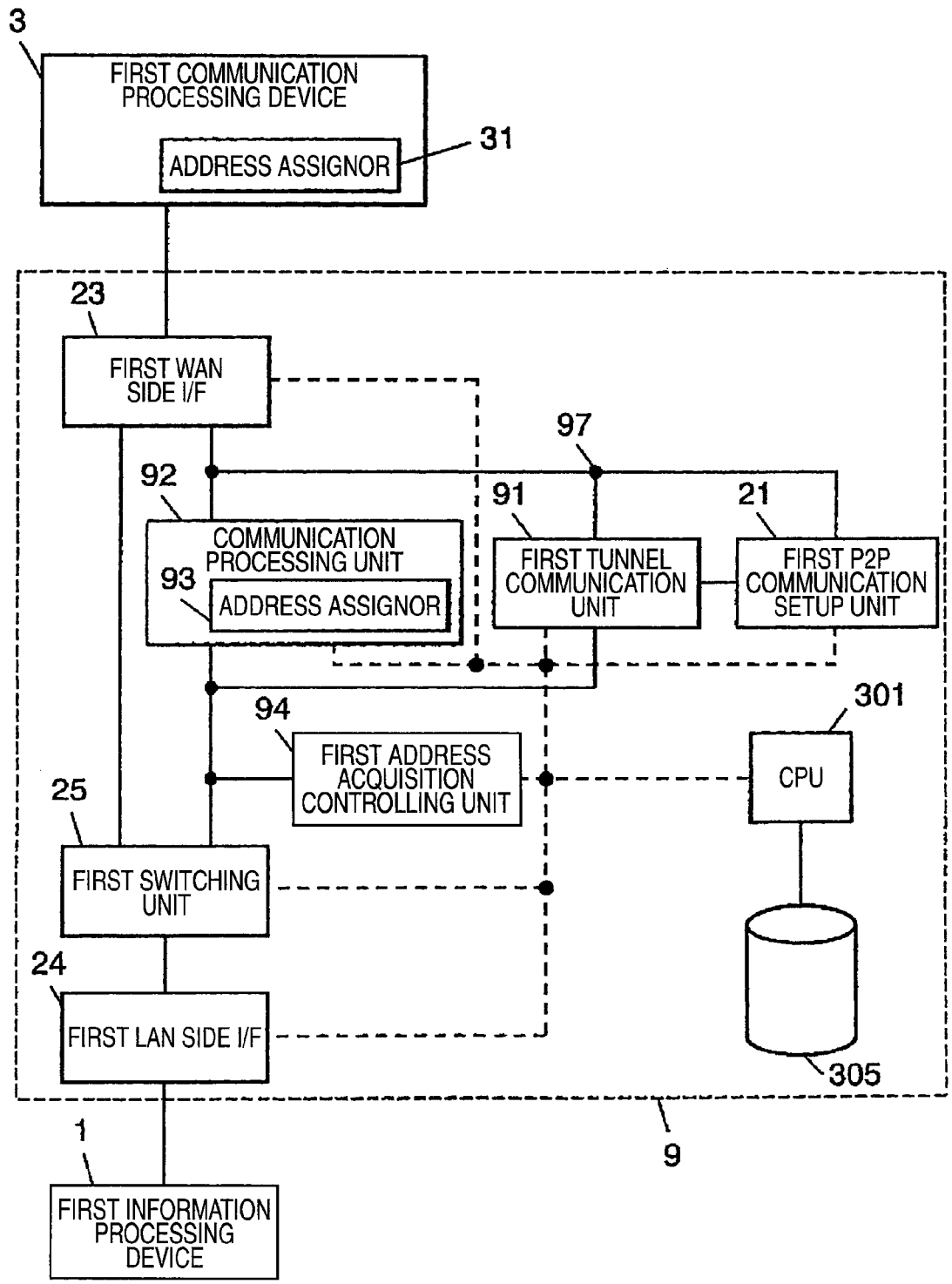
FIG. 16 is a block diagram illustrating a configuration of a first tunnel communication device according to a second embodiment of the invention.
Figure 17:
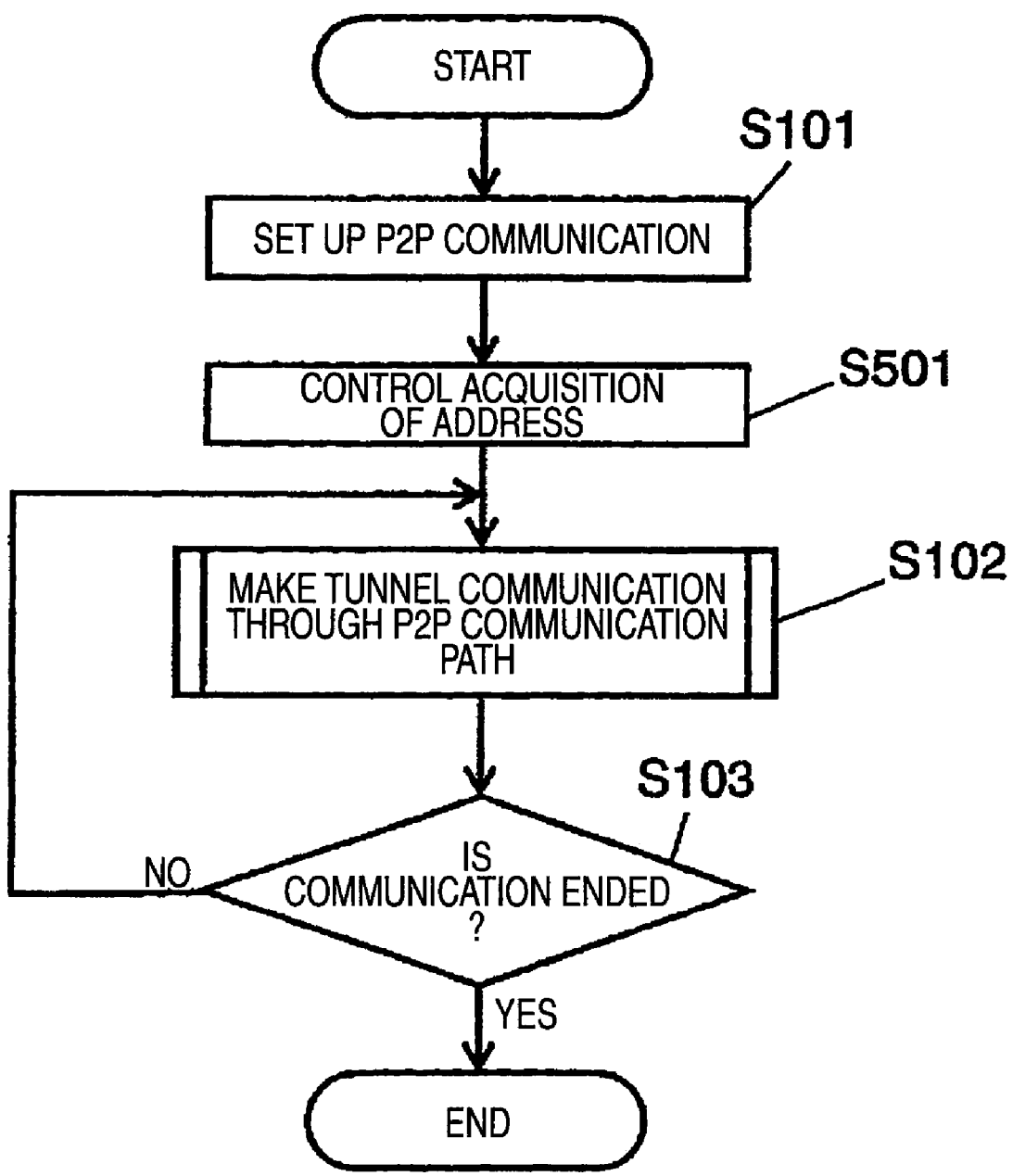
FIG. 17 is a flowchart illustrating an operation of the first tunnel communication device according to the second embodiment.
Figure 18:
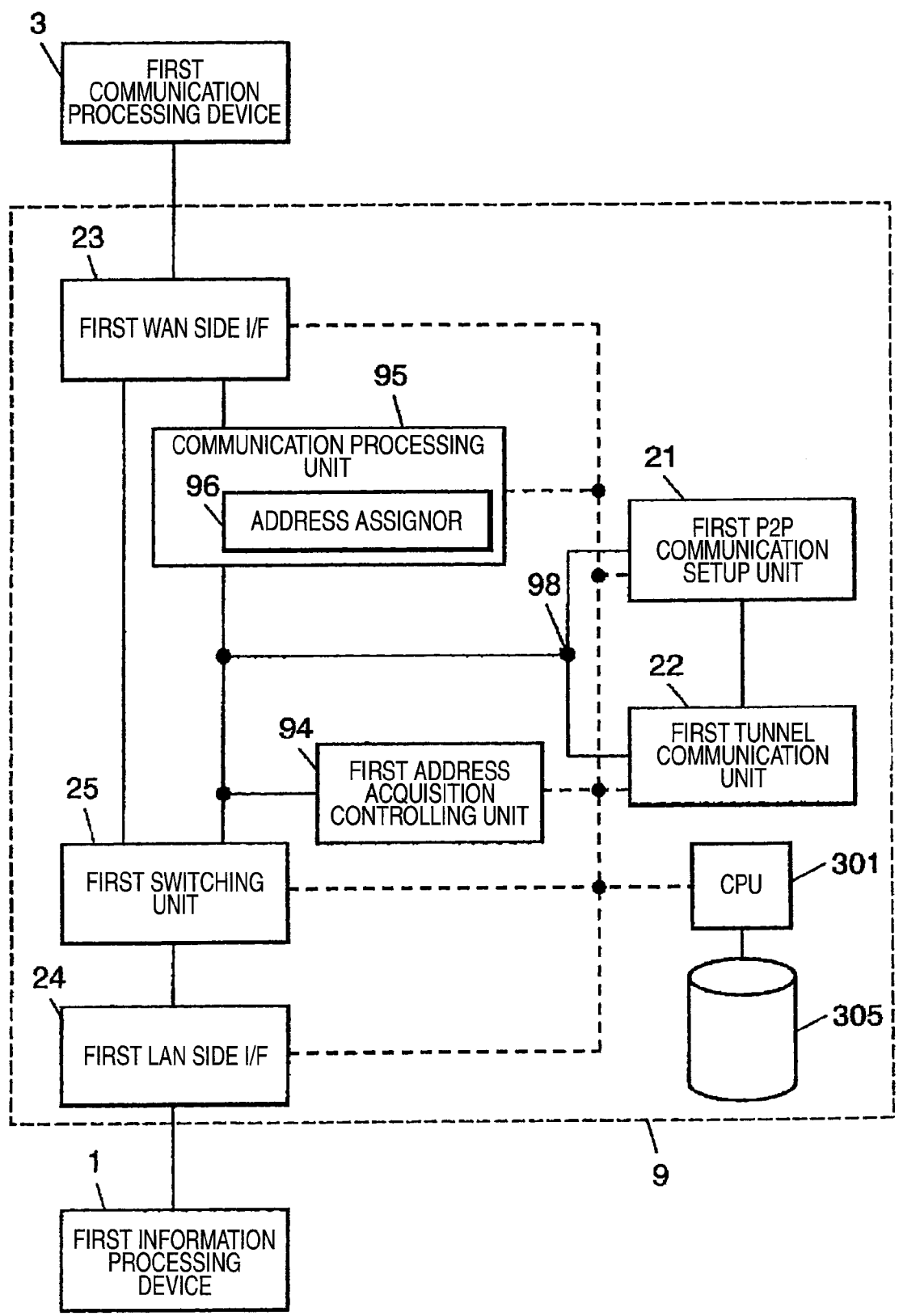
FIG. 18 is a block diagram illustrating another configuration of the first tunnel communication device according to the second embodiment.

An information processing system and a tunnel communication device according to a second embodiment of the invention will be described with reference to the drawings. FIG. 16 is a block diagram illustrating a configuration of a first tunnel communication device according to a second embodiment of the invention. FIG. 17 is a flowchart illustrating an operation of the first tunnel communication device according to the second embodiment. FIG. 18 is a block diagram illustrating another configuration of the first tunnel communication device according to the second embodiment. In the information processing system according to this embodiment, the first tunnel communication device has a communication processing unit therein. The configuration of the information processing system according to this embodiment is equal to the configuration according to the first embodiment shown in FIG. 1, except that the first tunnel communication device 2 is replaced with a first tunnel communication device 9 shown in FIG. 16, and thus its description will be omitted.

In FIG. 16, the first tunnel communication device 9 includes a first P2P communication setup unit 21, a first WAN side I/F 23, a first LAN side I/F 24, a first switching unit 25, a first tunnel communication unit 91, a communication processing unit 92, a first address acquisition controlling unit 94, a CPU 301, and a recording medium 305. Configurations and operations of the elements other than the first tunnel communication unit 91, the communication processing unit 92, and the first address acquisition controlling unit 94 are similar to those of the first embodiment and description thereof will be omitted.

The first tunnel communication unit 91 serves to make a tunnel communication through the path of the P2P communication set up by the first P2P communication setup unit 21 and is the same as the first tunnel communication unit 22. However, the first tunnel communication unit 91 encapsulates a packet received from the local side and transmits the encapsulated packet through the path of the P2P communication set up by the first P2P communication setup unit 21. Here, the packets which the first tunnel communication unit 91 receives from the local side include a packet transmitted from the first information processing device 1 and a packet transmitted from the communication processing unit 92 to the local side, that is, to the first switching unit 25. The first tunnel communication unit 91 decapsulates the encapsulated packet received from the wide side and transmits the resultant packet to the local packet.

Similarly to the first embodiment, when the tunnel communication is made through the path of the P2P communication, the first tunnel communication unit 91 encapsulates a packet transmitted from the first information processing device 1 or a packet which is transmitted from the local side of the communication processing unit 92 and of which the destination is the second information processing device 4, transmits the encapsulated packets through the path of the P2P communication, and may not encapsulate the other packets. The first tunnel communication unit 91 may be embodied by hardware or may be embodied by software such as a driver for driving a communication device such as a modem or network card.

Similarly to the first embodiment, it is assumed that the first P2P communication setup unit 21 and the first tunnel communication unit 91 make a communication using the same address such as an IP address or a MAC address. For example, an IP address, a MAC address, and a port number are set at a position denoted by reference numeral 97 in FIG. 16. The communication processing unit 92 performs the communication-related process. The communication processing unit 92 may have a NAT function of changing an address, a packet filtering function, or both functions. In this embodiment, the communication processing unit 92 has both functions.

The communication processing unit 92 includes an address assignor 93. The address assignor 93 is the same as the address assignor 31 of the first embodiment. In this embodiment, the communication processing unit 92 performs the communication-related process on the non-encapsulated packet transmitted through the first tunnel communication device 9. That is, the encapsulated packet does not pass through the communication processing unit 92 and is not subjected to the communication-related process by the communication processing unit 92. As can be clearly seen from FIG. 16, in the normal mode, the packets transmitted between the first WAN side I/F 23 and the first LAN side I/F 24 do not pass through the communication processing unit 92 and are not subjected to the communication-related process by the communication processing unit 92.

In this embodiment, since the communication processing unit 92 includes the address assignor 93, the address of the first information processing device 1 is assigned by the address assignor 93 in the tunnel mode. On the other hand, the address used for the first tunnel communication unit 91 and the first P2P communication setup unit 21 and the address on the wide side of the communication processing unit 92 are assigned by the address assignor 31 of the first communication processing device 3. In the normal mode, the address of the first information processing device 1 is assigned by the address assignor 31.

Here, a specific example of the address in the tunnel mode will be described. For example, the local side address of the first communication processing device 3 is "192.168.2.1", the address of the first tunnel communication unit 91 and the first P2P communication setup unit 21 is "192.168.2.2", and the wide side address of the communication processing unit 92 is "192.168.2.3." The local side address of the communication processing unit 92 is "192.168.0.1" and the address of the first information processing device 1 is "192.168.0.10."

In this way, in the first tunnel communication device 9 according to this embodiment, two network addresses "192.168.2" and "192.168.0" are used in the device. When the first switching unit 25 switches a mode from the normal mode to the tunnel mode, the first address acquisition controlling unit 94 controls the first information processing device 1 to perform the address acquiring process. The first address acquisition controlling unit 94 is the same as the address acquisition controlling unit 56 of the first embodiment and description thereof is omitted.

Next, an operation of the first tunnel communication device 9 according to this embodiment will be described with the flowchart of FIG. 17. In the flowchart of FIG. 17, the processes other than step S501 are similar to the flowchart of FIG. 4 according to the first embodiment and thus description thereof is omitted. In step S501, the first address acquisition controlling unit 94 controls the first information processing device 1 to perform the address acquiring process.

The other operations, for example, the operations of the second tunnel communication device 5, etc. are equal to those of the first embodiment and description thereof is omitted. However, the communication processing unit 92 performs a predetermined process such as an address changing process on the packet transmitted from the local side to the communication processing unit 92, transmits the resultant packet to the wide side, performs a predetermined process such as an address translating process on the packet transmitted from the wide side to the communication processing unit 92, and transmits the resultant packet to the local side.

Next, the tunnel communication between the first information processing device 1 and the second information processing device 4 and the communication with another device with which the first information processing device 1 and the second information processing device 4 communicate through the communication line 100 will be described in brief. The process of allowing the second information processing device 4 to acquire an address is the same as the first embodiment, except that the address assignor 93 assigns the address, and description thereof is omitted.

When a packet is transmitted from the first information processing device 1 to the second information processing device 4, the packet is transmitted using the address of the second information processing device 4 as the destination. Then, similarly to the first embodiment, the first tunnel communication unit 91 receives and encapsulates the packet and transmits the encapsulated packet using the wide side address and the port number of the second communication processing device 6 received from the first P2P communication setup unit 21 as the destination. The packet is received by the second communication processing device 6, is transmitted to the second tunnel communication device 5, and is received by the second tunnel communication device 5. The second tunnel communication unit 52 decapsulates the received packet and transmits to the second information processing device 4 the decapsulated packet. The same is true when the packet is transmitted from the second information processing device 4 to the first information processing device 1.

Since the destination address of the packet transmitted from the first information processing device 1 to the second information processing device 4 is the address of the second information processing device, the communication processing unit 92 does not receive the packet. Since the destination address of the packet transmitted from the second information processing device 4, encapsulated by the second tunnel communication device 5, and transmitted to the first tunnel communication device 9 through the path of the P2P communication is the address of the first tunnel communication unit 91, the tunnel communication unit 92 does not receive the packet.

Next, a case where the first information processing device 1 communicates with another device through the communication line 100 will be described. For example, when the first information processing device 1 transmits a packet using a predetermined server connected to the communication line 100 as a destination, the packet is received by the communication processing unit 92, is subjected to a predetermined process such as an address translating process, and then is transmitted to the communication line 100 through the first communication processing device 3. The reply packet from the predetermined server in response to the packet is received through the first communication processing device 3 by the communication processing unit 92, is subjected to a predetermined process such as an address translating process, and then is transmitted to the first information processing device 1.

Next, a case where the second information processing device 4 communicates with another device through the communication line 100 will be described. For example, when the second information processing device 4 transmits a packet using a predetermined server connected to the communication line 100 as a destination, the packet is encapsulated by the second tunnel communication device 5 and then is transmitted to the first tunnel communication device 9. The first tunnel communication unit 91 of the first tunnel communication device 9 receives the packet, decapsulates the received packet, and transmits the resultant packet to the local side. The packet transmitted from the first tunnel communication unit 91 to the local side is the same packet as transmitted from the second information processing device 4.

Accordingly, the packet is treated as if it is the same as the packet transmitted from the information processing device connected to the local side of the first tunnel communication device 9 to the communication line 100, is subjected to a predetermined process such as an address translating process by the communication processing unit 92, and then is transmitted to the communication line 100 through the first communication processing device 3. The reply packet from the predetermined server device in response to the packet is received by the communication processing unit 92 through the first communication processing device 3, is subjected to a predetermined process such as an address translating process, and then is transmitted to the local side of the communication processing unit 92.

The first tunnel communication unit 91 receives and encapsulates the packet and transmits the encapsulated packet to the second tunnel communication device 5 through the path of the P2P communication. The second tunnel communication device 5 decapsulates the encapsulated packet and transmits the resultant packet to the second information processing device 4. In this way, the second information processing device 4 can access the communication line 100 such as the Internet.

On the other hand, it is assumed that a third information processing device (not shown) is connected to the local side of the first communication processing device 3 and the wide side of the first tunnel communication device 9. The third information processing device can communicate with the first information processing device 1 in the normal mode but cannot communicate with the first information processing device in the tunnel mode. Since the third information processing device includes the communication processing unit 92, the third information processing device as a calling party cannot transmit a packet to the local side of the first tunnel communication unit 91.

Accordingly, it is possible to prevent an unexpected third device from being added to the communication between the first information processing device 1 and the second information processing device 4 in the same segment, thereby enhancing the security. On the other hand, the first information processing device 1 and the second information processing device 4 can access the communication line 100. Accordingly, when the information processing devices 1 and 4 need to access the communication line 100 such as the Internet while making a communication in the same segment, the access can be carried out. For example, the first information processing device 1 ad the second information processing device 4 can access a predetermined server in the Internet while executing an interactive game therebetween. In the tunnel mode, the first information processing device 1 and the second information processing device 4 as the calling party can access the third information processing device.

As described above, in the information processing system according to this embodiment, similarly to the first embodiment, the first information processing device 1 and the second information processing device 4 belonging to different local area networks can be set to the same segment. The first information processing device 1 includes the communication processing unit 92. Accordingly, when the tunnel communication through the path of the P2P communication is made between the first information processing device 1 and the second information processing device 4, a device connected to the local side of the first communication processing device 3 and the wide side of the first tunnel communication device 9 cannot be added as the calling party to the communication, thereby enhancing the communication security.

The configuration of the first tunnel communication device 9 is not limited to the configuration shown in FIG. 16, but may be shown in FIG. 18. In FIG. 18, the first tunnel communication device 9 includes a first P2P communication setup unit 21, a first tunnel communication unit 22, a first WAN side I/F 23, a first LAN side I/F 24, a first switching unit 25, a first address acquisition controlling unit 94, a communication processing unit 95, a CPU 301, and a recording medium 305. The configurations and operations of the elements other than the communication processing unit 95 are similar to those described in the first embodiment and the second embodiment. The communication processing unit 95 is the same as the communication processing unit 92 and the address assignor 96 of the communication processing unit 95 is the same as the address assignor 93.

However, the communication processing unit 95 performs the communication-related process on all the packets transmitted through the first tunnel communication device 9, that is, both the packet transmitted from the local side and the packet transmitted from the wide side. In the configuration shown in FIG. 18, since the first tunnel communication unit 22 is disposed on the local side of the communication processing unit 95, the address used for the first P2P communication setup unit 21 and the first tunnel communication unit 22 is also assigned by the address assignor 96 of the communication processing unit 95. When the first P2P communication setup unit 21 sets up the P2P communication, the P2P communication is set up by the use of two communication processing means of the communication processing unit 95 and the first communication processing device 3, but the substantial process for setting up the P2P communication is not changed.

It is as described above in this embodiment that the first information processing device 1 and the second information processing device 4 can access the communication line 100 while making a communication between the first information processing device 1 and the second information processing device 4 and that a device connected to the local side of the first communication processing device 3 and the wide side of the first tunnel communication device 9 cannot access as the calling party the first information processing device 1 and the second information processing device 4 when the first information processing device 1 and the second information processing device 4 make a tunnel communication. The IP address, the MAC address, and the port number of the first P2P communication setup unit 21 and the first tunnel communication unit 22 are set at the position denoted by reference numeral 98 in FIG. 18.

Although it has been described in this embodiment shown in FIG. 16 that the communication processing unit 92 includes the address assignor 93, the communication processing unit 92 and the address assignor 93 may be disposed independently of each other in the first tunnel communication device 9. When the communication processing unit 92 has only the packet filtering function, the first tunnel communication device 9 may not include the address assignor 93. When the communication processing unit 92 does not include the address assignor 93, the first information processing device 1 uses the address assigned by the address assignor 31 of the first communication processing device 3 and thus the first tunnel communication device 9 may not include the first address acquisition controlling unit 94. The same is true of the configuration shown in FIG. 18.

Although it has been described in this embodiment shown in FIG. 16 that the packet does not pass through the communication processing unit 92 in the normal mode, the packet may pass through the communication processing unit 92 in the normal mode. However, in this case, the communication processing unit 92 does not perform the communication-related process in the normal mode. The same is true of the configuration shown in FIG. 18.

Third Embodiment

Figure 19:
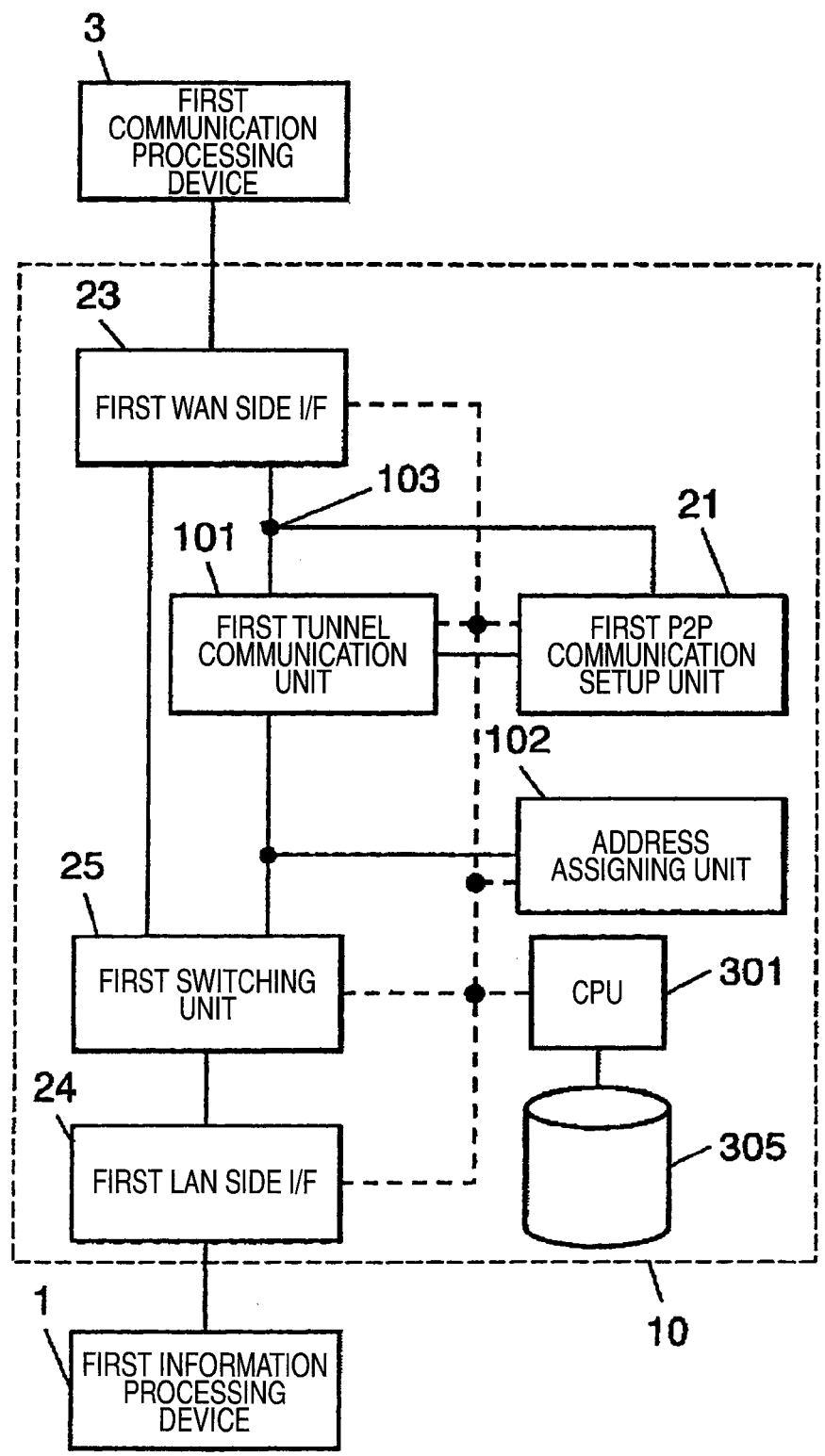
FIG. 19 is a block diagram illustrating a configuration of a first tunnel communication device according to a third embodiment of the invention.
Figure 20:
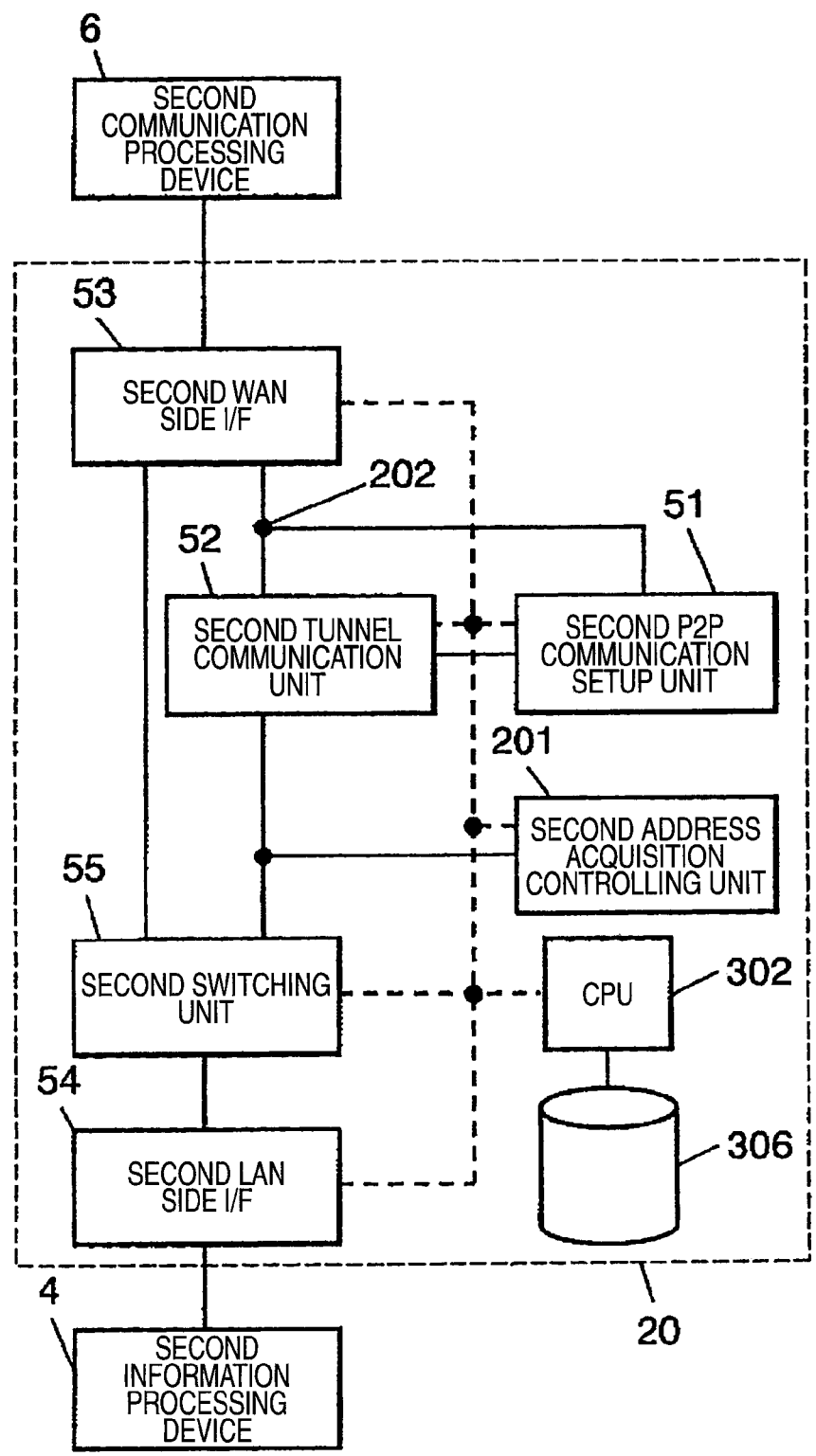
FIG. 20 is a block diagram illustrating a configuration of a second tunnel communication device according to the third embodiment.
Figure 21:
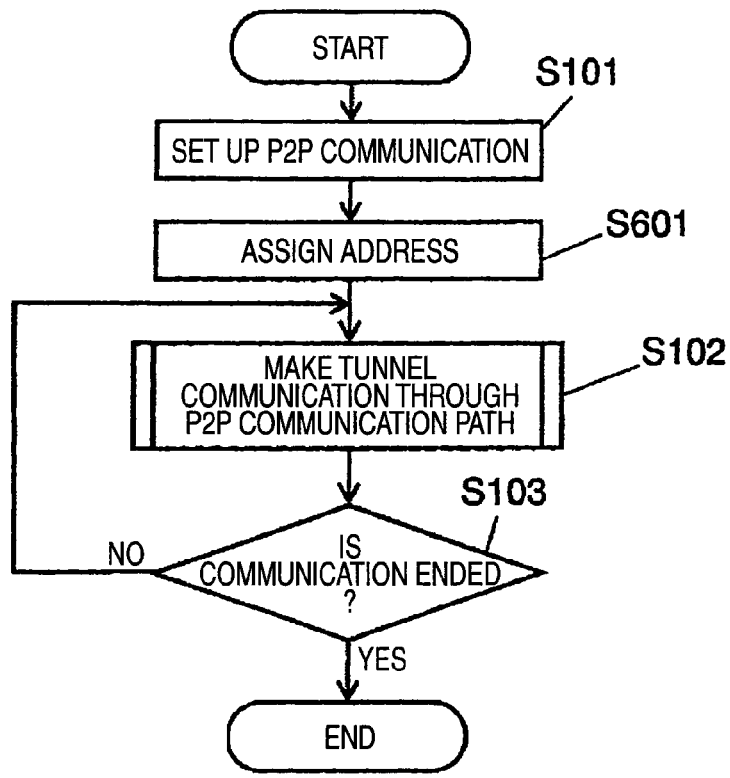
FIG. 21 is a flowchart illustrating an operation of the first tunnel communication device according to the third embodiment.
Figure 22:
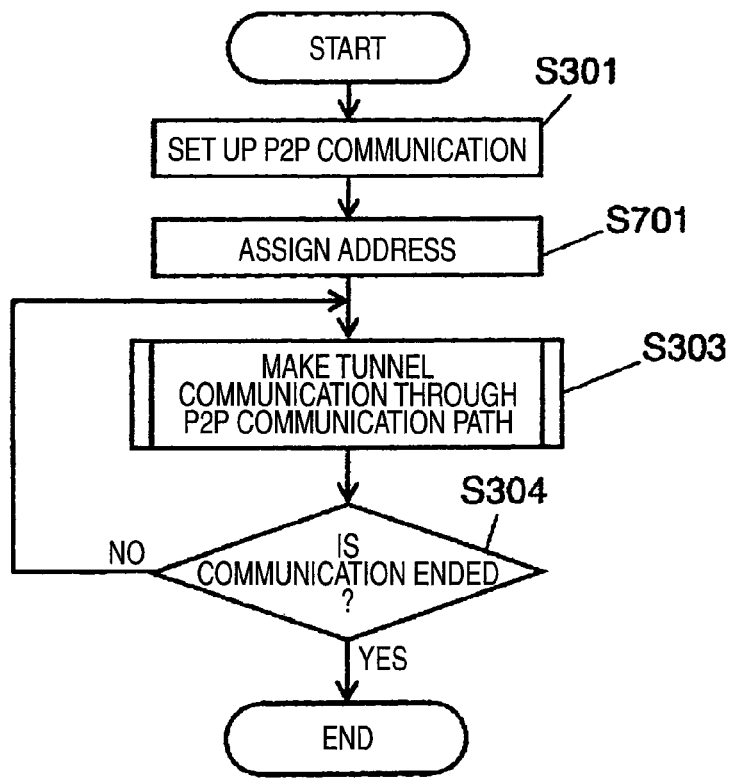
FIG. 22 is a flowchart illustrating an operation of the second tunnel communication device according to the third embodiment.

An information processing system according to a third embodiment of the invention will be described with reference to the drawings. FIG. 19 is a block diagram illustrating a configuration of a first tunnel communication device according to a third embodiment of the invention. FIG. 20 is a block diagram illustrating a configuration of a second tunnel communication device according to the third embodiment. FIG. 21 is a flowchart illustrating an operation of the first tunnel communication device according to the third embodiment. FIG. 22 is a flowchart illustrating an operation of the second tunnel communication device according to the third embodiment.

In the information processing system according to this embodiment, all packets transmitted from the first information processing device 1 are encapsulated and transmitted when a tunnel communication is made. The configuration of the information processing system according to this embodiment similar to that of the first embodiment shown in FIG. 1, except that the first tunnel communication device 2 is replaced with a first tunnel communication device 10 shown in FIG. 19, and thus description thereof will be omitted.

FIG. 19 is a block diagram illustrating a configuration of the first tunnel communication device according to this embodiment. In FIG. 19, the first tunnel communication device 10 includes a first P2P communication setup unit 21, a first WAN side I/F 23, a first LAN side I/F 24, a first switching unit 25, a first tunnel communication unit 101, a first address assigning unit 102, a CPU 301, and a recording medium 305. The configurations and operations of the elements other than the first tunnel communication unit 101 and the first address assigning unit 102 are the same as the first embodiment and thus description thereof is omitted.

The first tunnel communication unit 101 serves to make a tunnel communication through the path of the P2P communication set up the first P2P communication setup unit 21 and is the same as the first tunnel communication unit 22. However, when a communication is made through the path of the P2P communication, the first tunnel communication unit 101 encapsulates all the packets transmitted from the first information processing device and transmits the encapsulated packets through the path of the P2P communication. The first tunnel communication unit 101 decapsulates the encapsulated packets received from the wide side and transmits the resultant packets to the local side. The first tunnel communication unit 101 may be embodied by hardware or may be embodied by software such as a driver for driving a communication device such as a modem or network card.

Similarly to the first embodiment, it is assumed that the first P2P communication setup unit 21 and the first tunnel communication unit 101 make a communication using the same address such as an IP address or a MAV address. For example, the IP address, the MAC address, and the port number are set at the position denoted by reference numeral 103 in FIG. 19. The first address assigning unit 102 assigns an address to the first information processing device 1. The address is an address used for the communication of the first information processing device 1 with the second information processing device 4. Similarly to the above-mentioned embodiments, when the first information processing device 1 and the second information processing device 4 make a tunnel communication through the path of the P2P communication, the first address assigning unit 102 assigns an address to the first information processing device 1 so as to set the first information processing device 1 and the second information processing device 4 to the same segment.

The address assigning process may include or may not include the control for performing a process of allowing the information processing device to acquire an address, which is performed by the address acquisition controlling unit 56 in the first embodiment and is performed by the first address acquisition controlling unit 94 in the second embodiment. That is, when the address assigning process includes the above-mentioned control, the first address assigning unit 102 may control the first information processing device 1 to perform the address acquiring process, and may assign an address in response to an address acquiring request transmitted from the first information processing device 1. Details of the address assigning process will be described later.

FIG. 20 is a block diagram illustrating a configuration of the second tunnel communication device 20 according to this embodiment. In FIG. 20, the second tunnel communication device 20 includes a second P2P communication setup unit 51, a second tunnel communication unit 52, a second WAN side I/F 53, a second LAN side I/F 54, a second switching unit 55, a second address assigning unit 201, a CPU 302, and a recording medium 306. The configurations and operations of the elements other than the second address assigning unit 201 are the same as the first embodiment and thus description thereof is omitted. Here, for example, the IP address, the MAC address, and the port number of the second P2P communication setup unit 51 and the second tunnel communication unit 52 are set at the position denoted by reference numeral 202 in FIG. 20.

The second address assigning unit 201 assigns an address to the second information processing device 4. The address is an address used for a communication of the second information processing device 4 with the first information processing device 1. Here, the address assigning process of the first address assigning unit 102 and the second address assigning unit 201 is described. As described above. The first address assigning unit 102 and the second address assigning unit 201 assign an address so that the first information processing device 1 and the second information processing device 4 are in the same segment so as to communicate with each other.

For example, the address assigning units 102 and 201 store two addresses of "192.168.100.1" and "192.168.100.2", assign one of the stored addresses, for example, "192.168.100.1", to the information processing device connected to the tunnel communication device having great device identification information, and assign the other of the stored addresses, for example, "192.168.100.2", to the information processing device connected to the tunnel communication device having small device identification information, with reference to the device identification information of the first tunnel communication device 10 and the device identification information of the second tunnel communication device 20.

Alternatively, the address to be assigned may be determined depending on whether the information processing device is a calling party or a called party. The first address assigning unit 102 and the second address assigning unit 201 may make a communication through the path of the P2P communication and may assign addresses to the first information processing device 1 and the second information processing device 4 by the use of a DHCP method or an automatic IP (hereinafter, referred to as "Auto IP"). In this case, one of the address assigning units 102 and 201 may determine the addresses of the information processing devices 1 and 4 and the other address assigning unit may assign the address, which is determined by the one address assigning unit, to the information processing device. The address may be assigned using different methods.

Next, an operation of the first tunnel communication device 10 according to this embodiment will be described with reference to the flowchart of FIG. 21. In the flowchart of FIG. 21, the processes other than step 601 are the same as the flowchart of FIG. 4 according to the first embodiment and thus description thereof is omitted. In step 601, the first address assigning unit 102 assigns an address to the first information processing device 1. As described above, the first address assigning unit 102 may assign an address after the communication with the second address assigning unit 201, or may assign an address without making a communication with the second address assigning unit 201.

Next, an operation of the second tunnel communication device 20 according to this embodiment will be described with reference to the flowchart of FIG. 22. In the flowchart of FIG. 21, the processes other than step 701 are the same as the flowchart of FIG. 6 according to the first embodiment and thus description thereof is omitted. In step 701, the second address assigning unit 201 assigns an address to the second information processing device 4. As described above, the first address assigning unit 102 may assign an address after the communication with the second address assigning unit 201, or may assign an address without making a communication with the second address assigning unit 201. In this embodiment, the tunnel communication through the path of the P2P communication between the first information processing device 1 and the second information processing device 4 is the same as the above-mentioned embodiments and thus description thereof is omitted.

As described above, since the information processing system according to this embodiment includes the first tunnel communication device 10 and the second tunnel communication device 20, the first information processing device 1 and the second information processing device 4 can be set to the same segment and thus the first information processing device 1 and the second information processing device 4 can communicate with each other as if they are in the same local area network.

According to this embodiment, in the tunnel mode, a new address is assigned to the first information processing device 1 and the second information processing device 4 and the packets transmitted from the first information processing device 1 and the second information processing device 4 are all encapsulated by the tunnel communication devices 10 and 20. Accordingly, the first information processing device 1 and the second information processing device 4 cannot make a communication with a device connected to the communication line 100 or a device connected to the local side of the first communication processing device 3 and the wide side of the first tunnel communication device 9. As a result, in the tunnel mode, the communication security between the first information processing device 1 and the second information processing device 4 is enhanced.

Although it has been described in the embodiments that the first P2P communication setup unit 21 and the second P2P communication setup unit 51 transmit and receive the packets so as to set up the P2P communication using the communication processing device, the first P2P communication setup unit 21 may set up the path of the P2P communication by the use of the UPnP function. Specifically, the first P2P communication setup unit 21 and the second P2P communication setup unit 51 assign ports to the first communication processing device 3 and the second communication processing device 6 by the use of the UPnP function and allow the packet transmitted from a predetermined port on the wide side of the communication processing device to be received by the first tunnel communication device 2 or the second tunnel communication device 5. The assigned port number and the address of the communication processing device may be transmitted between the first P2P communication setup unit 21 and the second P2P communication setup unit 51 through the P2P communication setup server 7, thereby making the P2P communication therebetween.

Although it has been described that the information processing system includes the P2P communication setup server 7, the information processing system may not include the P2P communication setup server 7. For example, by allowing a user to input the wide-side address and the port number of the second communication processing device 6 to the first tunnel communication device 2, the first P2P communication setup unit 21 may know the wide-side address and the port number of the second communication processing device 6 and may set up the P2P communication with the second tunnel communication device 5.

Although it has been described that the address assignor is a DHCP server, the address assignor may assign an address by the use of a method other than the DHCP. For example, the Auto IP, the IP control protocol (hereinafter, referred to as "IPCP"), or the automatic private IP address assignment (hereinafter, referred to as "APIPA") may be used to assign an address. The first information processing device and the first tunnel communication device may be provided monolithically. That is, the first tunnel communication device may include the first information processing device. Similarly, the second information processing device and the second tunnel communication device may be provided monolithically. That is, the second tunnel communication device may include the second information processing device.

Although it has been described that the first tunnel communication unit 22 or 91 receives and encapsulates the packet of which the destination is the second information processing device 4 or the packet of which the destination is unspecifically plural, all the packets transmitted may be received and encapsulated and may be transmitted through the path of the P2P communication, regardless of the destinations. When a device corresponding to the destination is present, the packet is received by the second tunnel communication device. Otherwise, the packet is not received. Although it has been described that the first tunnel communication unit 101 and the second tunnel communication unit 52 encapsulate and transmit all the packets transmitted from the local side, the packet of which the destination is the first information processing device 1 or the packet of which the destination is unspecifically plural may be received and encapsulated and the other packets may not be encapsulated.

Although it has been described that the tunnel communication device includes the switching unit, the path of the packet may be switched at two positions of the WAN side I/F side and the LAN side I/F side so that the packet transmitted from the wide side does not reach the tunnel communication unit, when the switching unit switches the mode to the normal mode. Although it has been described that the tunnel communication device includes the switching unit, the tunnel communication device may not include the switching unit. In this case, the tunnel communication device is the same as operating only in the tunnel mode.

The respective tunnel communication devices may have both the function of the first tunnel communication device and the function of the second tunnel communication device. For example, it may be determined whether it serves as the first tunnel communication device or the second tunnel communication device described in the above-mentioned embodiments, depending on the calling party or the called party, or depending on the size difference of the device identification information of the tunnel communication device.

It has been described that the address acquisition controlling unit for controlling the information processing device to perform the address acquiring process or the address assigning unit for assigning an address is provided when the normal mode is changed to the tunnel mode. Even when the tunnel mode is changed to the normal mode, the address acquisition controlling unit may control the information processing device to perform the address acquiring process. For example, even when the tunnel mode is changed to the normal mode, the second information processing device 4 according to the first embodiment cannot make a communication in the normal mode using the address used in the tunnel mode. Accordingly, the address has to be reset by allowing the second communication processing device 6, etc. to assign an address, or the address acquisition controlling unit may provide a trigger.

By making the tunnel communication through the path of the P2P communication between the tunnel communication devices, it has been described that the first information processing device 1 and the second information processing device 4 are set to the same segment. However, the first information processing device 1 and the second information processing device 4 may not be set to the same segment, so long as they can make a communication as if they belong to the same network without any particular setting by making the tunnel communication through the path of the P2P communication between the tunnel communication devices.

For example, when the tunnel communication is made through the path of the P2P communication between the tunnel communication devices, as described above, a predetermined communication processing device having the NAT function or having the packet filtering function may be disposed between the first information processing device 1 and the second information processing device 4. In this case, by allowing the information processing device on the local side of the communication processing device to serve as the calling party, it is possible to make a communication as if they belong to the same network, without performing any particular setting.

In the process of step 202 shown in FIG. 5 and the process of step 402 shown in FIG. 7, instead of determining whether a packet is encapsulated, it may be determined whether the decapsulation process should be performed or the encapsulation process should be performed, depending on the wide side or the local side from which the packet is received. Depending on the fact whether a packet is received from a predetermined port on the wide side, it may be determined whether the decapsulation process should be performed or the encapsulation process should be performed. Depending on the destination address of the packet, it may be determined whether the decapsulation process should be performed or the encapsulation process should be performed. For example, the P2P communication is made through a predetermined port. Accordingly, it may be determined that the packet transmitted from the predetermined port on the wide side is the packet transmitted through the path of the P2P communication and thus the decapsulation process may be performed.

Even when the information processing system does not include the communication processing device, the first information processing device 1 and the second information processing device 4 may be allowed to make a tunnel communication through the path of the P2P communication in the same sequence. This is because the tunnel communication device could not know simply whether a communication processing device is present on the wide side, but can allow the first information processing device 1 and the second information processing device 4 to make a tunnel communication through the path of the P2P communication by executing the sequence of the embodiment regardless of the presence of the communication processing device.

As described above, two or more information processing devices may be connected to the local side of the tunnel communication device. When two or more information processing devices are connected to the local side of the tunnel communication device, the tunnel communication device may store an address such as an IP address or a MAC address corresponding to the destination device of the path of the P2P communication so as to receive the packet transmitted from the information processing device on the local side. Although it has been that the communication is made using the IP, the communication may be made using other protocols.

The tunnel communication device may not include the address acquisition controlling unit. For example, the information processing device may be made to perform the address acquiring process when detecting that the communication could not be made using the address having been used up to that time. When the tunnel communication is started, the information processing device may perform the address acquiring process by controlling a user to perform the process of acquiring an address such as pushing a button for resetting the information processing device or performing the address acquiring process.

The addresses of the information processing devices in the tunnel mode may be set by a device or a unit other than the address assignor or the address assigning unit. For example, a user may input an address to the information processing device directly to set the address. The communication protocol may be, for example, IP version (hereinafter, referred to as "v") 4 (Internet Protocol version 4) or IPv6 (Internet Protocol version 6).

The processes or the functions may be intensively performed by a single device or a single system, or may be extensively performed by plural devices or plural systems. The elements may be embodied by exclusive hardware, or the elements which can be embodied by software may be embodied by executing programs. For example, software programs recorded in a recording medium such as a hard disc or a semiconductor memory can be read out and executed by a program executing unit such as a CPU, thereby embodying the elements.

The software used to embody the tunnel communication devices of the above-mentioned embodiments is the following program. That is, the program allows a computer to execute: a P2P communication setup step that sets up a P2P communication with a device as a communication destination; and a tunnel communication step that makes a tunnel communication through a path of the P2P communication set up in the P2P communication setup step, wherein the tunnel communication step is to encapsulate a packet transmitted from the information processing device as a communication source, transmit the encapsulated packet through the path of the P2P communication, and decapsulate the encapsulated packet transmitted from the device as a communication destination through the path of the P2P communication.

In the program, the tunnel communication step is to encapsulate a packet which is transmitted from the information processing device as a communication source and of which the destination is a device at an end of the path of the P2P communication and transmit the encapsulated packet through the path of the P2P communication, when the tunnel communication is made through the path of the P2P communication. The other packets may not be encapsulated. In the program, the tunnel communication step may be to encapsulate all packets transmitted from the information processing device as a communication source and transmit the encapsulated packets through the path of the P2P communication, when the tunnel communication is made through the path of the P2P communication.

In the program, the communication step may not include a process to be performed only in hardware, such as a process to be performed by a modem or an interface card in the communication step. This program may be downloaded from a server or the like for execution, or a program recorded in a predetermined recording medium such as an optical disc of CD-ROM, a magnetic disc, or a semiconductor memory may be read out for execution. The number of computers for executing the program may be single or plural. That is, the program may be intensively executed or extensively executed.

The invention is not limited to the above-mentioned embodiments, but can be modified in various forms without departing from the scope of the invention.

INDUSTRIAL APPLICABILITY

As described above, since the information processing system, the tunnel communication device, the tunnel communication method, and the program according to the invention can make a communication between plural information processing devices belonging to different local area networks without a user's making a complex setup, they are useful for information processing systems for encapsulating a packet to make a tunnel communication.

The invention claimed is:

1. An information processing system comprising a first information processing device, a first tunnel communication device that can communicate with the first information processing device, a first communication processing device that processes the communication of the first tunnel communication device, a second information processing device, a second tunnel communication device that can communicate with the second information processing device, and a second communication processing device that processes the communication of the second tunnel communication device and that is connected to the first communication processing device through a communication line, wherein the first tunnel communication device includes:
a first peer-to-peer communication setup unit that sets up a peer-to-peer communication with the second tunnel communication device; and
a first tunnel communication unit that makes a tunnel communication through a path of the peer-to-peer communication set up by the first peer-to-peer communication setup unit, wherein the first tunnel communication unit encapsulates a packet transmitted from the first information processing device, transmits the encapsulated packet through the path of the peer-to-peer communication, and decapsulates the encapsulated packet transmitted from the second tunnel communication device through the path of the peer-to-peer communication, wherein the first information processing device receives the packet decapsulated by the first tunnel communication unit, wherein the second tunnel communication device includes:
a second peer-to-peer communication setup unit that sets up a peer-to-peer communication with the first tunnel communication device; and
a second tunnel communication unit that makes a tunnel communication through a path of the peer-to-peer communication set up by the second peer-to-peer communication setup unit, wherein the second tunnel communication unit encapsulates a packet transmitted from the second information processing device, transmits the encapsulated packet through the path of the peer-to-peer communication, and decapsulates the encapsulated packet transmitted from the first tunnel communication device through the path of the peer-to-peer communication, wherein the second information processing device receives the packet decapsulated by the second tunnel communication unit, wherein the first tunnel communication unit encapsulates a packet which is transmitted from the first information processing device and of which the destination is the second information processing device and transmits the encapsulated packet through the path of the peer-to-peer communication, when the tunnel communication using the path of the peer-to-peer communication is made, and wherein the second tunnel communication unit encapsulates all the packets transmitted from the second information processing device and transmits the encapsulated packets through the path of the peer-to-peer communication, when the tunnel communication using the path of the peer-to-peer communication is made, the information processing system further comprising an address assignor that belongs to the same local area network as the local area network to which the first tunnel communication device and that assigns an address to a device, wherein an address of the first information processing device is assigned by the address assignor, and wherein an address of the second information processing device is assigned by the address assignor in the tunnel communication through the path of the peer-to-peer communication.

2. The information processing system according to claim 1, wherein the first communication processing device includes the address assignor.

3. The information processing system according to claim 1, wherein the first tunnel communication device further includes a first switching unit that switches a mode between a tunnel mode in which the first information processing device makes a tunnel communication using the first tunnel communication unit and a normal mode in which the first information processing device does not make the tunnel communication, and wherein the second tunnel communication device further includes:

a second switching unit that switches a mode between a tunnel mode in which the second information processing device makes a tunnel communication using the second tunnel communication unit and a normal mode in which the second information processing device does not make the tunnel communication; and an address acquisition controlling unit that controls the second information processing device to perform a address acquiring process when the second switching unit switches the mode from the normal mode to the tunnel mode.

4. The information processing system according to claim 1, wherein the first tunnel communication device further includes a communication processing unit that performs communication-related process.

5. The information processing system according to claim 4, wherein the communication processing unit performs the communication-related process on a packet which is transmitted through the first tunnel communication device but not encapsulated.

6. The information processing system according to claim 4, wherein the communication processing unit performs the communication-related process on all packets which are transmitted through the first tunnel communication device.

7. The information processing system according to claim 4, wherein the communication processing unit includes the address assignor.

8. The information processing system according to claim 4, wherein the first tunnel communication device further includes:

a first switching unit that switches a mode between a tunnel mode in which the first information processing device makes a tunnel communication using the first tunnel communication unit and a normal mode in which the first information processing device does not make the tunnel communication; and a first address acquisition controlling unit that controls the first information processing device to perform a address acquiring process when the first switching unit switches the mode from the normal mode to the tunnel mode, wherein the second tunnel communication device further includes:

a second switching unit that switches a mode between a tunnel mode in which the second information processing device makes a tunnel communication using the second tunnel communication unit and a normal mode in which the second information processing device does not make the tunnel communication; and an address acquisition controlling unit that controls the second information processing device to perform a address acquiring process when the second switching unit switches the mode from the normal mode to the tunnel mode, and wherein the communication-related process are not performed by the communication processing unit in the normal mode.

9. A tunnel communication device comprising:

a peer-to-peer communication setup unit that sets up a peer-to-peer communication with a device as a communication destination; and a tunnel communication unit that makes a tunnel communication through a path of the peer-to-peer communication set up by the peer-to-peer communication setup unit, wherein the tunnel communication unit encapsulates a packet from an information processing device as a communication source, transmits the encapsulated packet through the path of the peer-to-peer communication, and decapsulates the encapsulated packet transmitted from the device as the communication destination through the path of the peer-to-peer communication, and wherein the tunnel communication unit encapsulates all packets transmitted from the information processing device as a communication source and transmits the encapsulated packets through the path of the peer-to-peer communication, the tunnel communication device further comprising:

a switching unit that switches a mode between a tunnel mode in which the information processing device as a communication source makes a tunnel communication using the tunnel communication unit and a normal mode in which the information processing device as a communication source does not make the tunnel communication; and an address acquisition controlling unit that controls the information processing device as a communication source to perform an address acquiring process, the process to acquire an address of a local area network which the device as a communication destination belongs to, when the switching unit switches the mode from the normal mode to the tunnel mode.

10. A tunnel communication method comprising:

a peer-to-peer communication setup step that sets up a peer-to-peer communication with a device as a communication destination; and a tunnel communication step that makes a tunnel communication through a path of the peer-to-peer communication set up in the peer-to-peer communication setup step, wherein the tunnel communication step is to encapsulate a packet transmitted from the information processing device as a communication source, transmit the encapsulated packet through the path of the peer-to-peer communication, and decapsulate the encapsulated packet transmitted from the device as a communication destination through the path of the peer-to-peer communication, and wherein the tunnel communication step is to encapsulate all packets transmitted from the information processing device as a communication source and transmits the encapsulated packets through the path of the peer-to-peer communication, the tunnel communication method further comprising:

a switching step that switches a mode between a tunnel mode in which the information processing device as a communication source makes a tunnel communication using the tunnel communication unit and a normal mode in which the information processing device as a communication source does not make the tunnel communication; and an address acquisition controlling step that controls the information processing device as a communication source to perform an address acquiring process when the switching unit switches the mode from the normal mode to the tunnel mode.

11. A computer program product embodied on a non-transitory computer readable medium which, when executed by a computer, cause the computer to execute:

a peer-to-peer communication setup step that sets up a peer-to-peer communication with a device as a communication destination; and a tunnel communication step that makes a tunnel communication through a path of the peer-to-peer communication set up in the peer-to-peer communication setup step, wherein the tunnel communication step is to encapsulate a packet transmitted from the information processing device as a communication source, transmit the encapsulated packet through the path of the peer-to-peer communication, and decapsulate the encapsulated packet transmitted from the device as a communication destination through the path of the peer-to-peer communication, and wherein the tunnel communication step is to encapsulate all packets transmitted from the information processing device as a communication source and transmits the encapsulated packets through the path of the peer-to-peer communication, the tunnel communication method further comprising:

a switching step that switches a mode between a tunnel mode in which the information processing device as a communication source makes a tunnel communication using the tunnel communication unit and a normal mode in which the information processing device as a communication source does not make the tunnel communication; and an address acquisition controlling step that controls the information processing device as a communication source to perform an address acquiring process when the switching unit switches the mode from the normal mode to the tunnel mode.

\* \* \* \* \*